United States Patent [19]

Feilchenfeld et al.

[11] Patent Number: 4,534,056
[45] Date of Patent: Aug. 6, 1985

[54] VOICE-RECOGNITION ELEVATOR SECURITY SYSTEM

[75] Inventors: Michal M. Feilchenfeld, Pittsburgh; Roger G. Byford, Washington Township, Armstrong County, both of Pa.; Wing C. Quan, Waldwick, N.J.

[73] Assignee: Westinghouse Electric Corp., Pittsburgh, Pa.

[21] Appl. No.: 411,792

[22] Filed: Aug. 26, 1982

[51] Int. Cl.³ ............................................... G10L 1/00
[52] U.S. Cl. ................................ 381/42; 364/513.5; 340/825.31
[58] Field of Search ..................... 381/41–49, 381/110; 187/29 R; 364/513.5; 340/825.31

[56] References Cited

U.S. PATENT DOCUMENTS

| | | | |
|---|---|---|---|
| 3,388,376 | 6/1968 | Magee | 340/20 |
| 4,341,288 | 7/1982 | Bass | 187/29 R |
| 4,449,189 | 5/1984 | Feix et al. | 381/42 |

Primary Examiner—E. S. Matt Kemeny
Attorney, Agent, or Firm—Donald R. Lackey

[57] ABSTRACT

A voice-controlled elevator security system. Access to an elevator system servicing a plurality of landings of a structure is controlled by comparing a voice signal of a potential user of the elevator system with stored voice signals of all authorized users. The comparison is accomplished by first digitizing the potential user's voice signal and comparing it, on a bit-by-bit basis, with a digital representation of the voice signals of all authorized users. Various criteria can be established for determining the number of binary bits that must agree to conclude that the potential user is an authorized user. Once this determination has been made, the authorized user can initiate car call signals for those landings to which the authorized user is permitted access.

21 Claims, 22 Drawing Figures

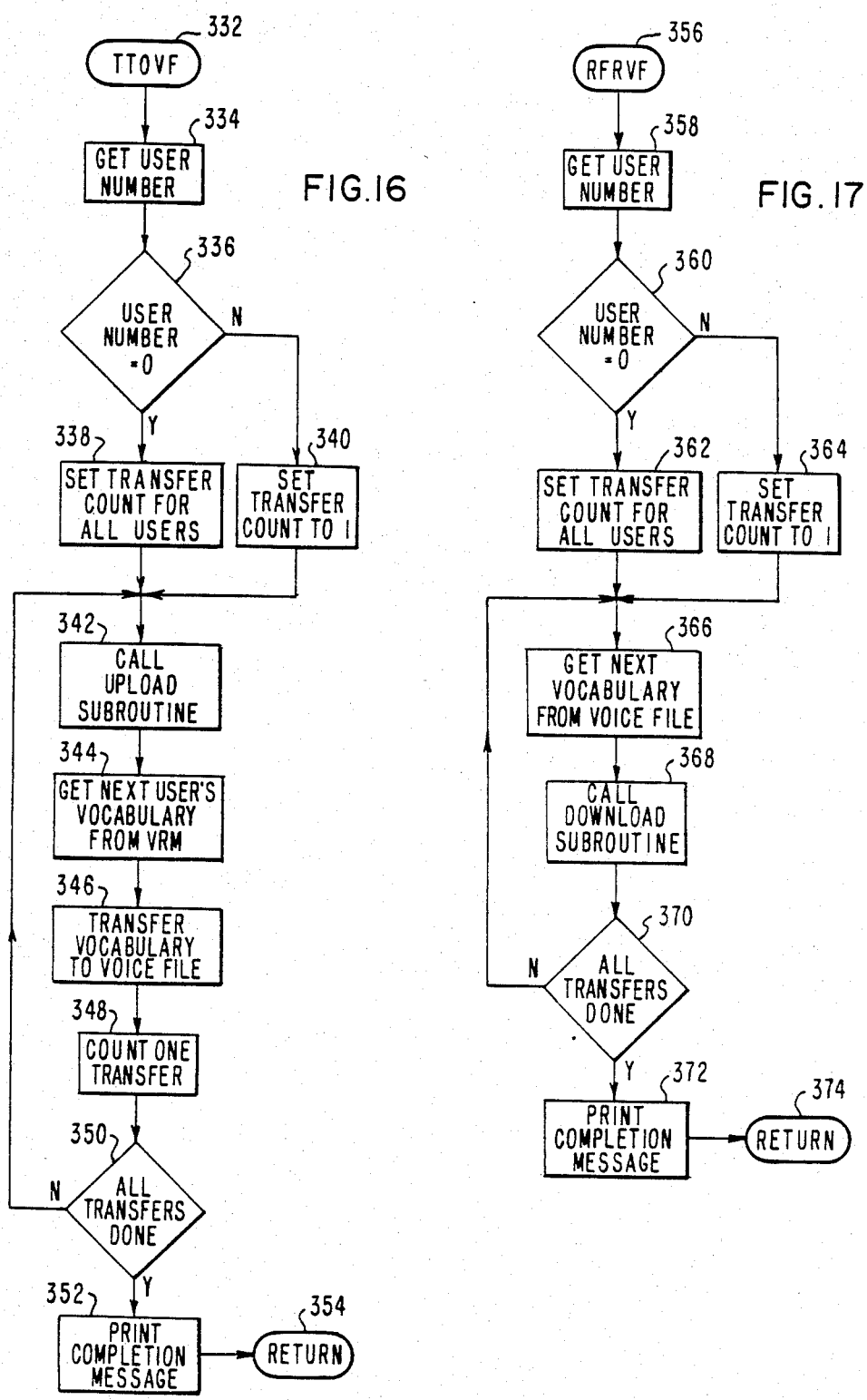

VOICE-RECOGNITION ELEVATOR SECURITY SYSTEM

BACKGROUND OF THE INVENTION

1. Field of the Invention

This invention relates generally to elevator security systems, and more particularly, to elevator security systems employing a voice-recognition device to control access to the elevator car.

2. Description of the Prior Art

Although the chief responsibility of the elevator attendant in older elevator systems was to operate the elevator car, the elevator attendant also provided a degree of security by limiting access to authorized, or at least familiar, passengers. With the advent of the user-operated elevator system, and the demise of the elevator attendant, it has become necessary to provide an elevator security system to insure that only authorized personnel have access to the elevator car. Access control is critical in high-rise office buildings and especially in living units where the elevator system must operate twenty-four hours a day. It is impossible for building security personnel to effectively monitor elevator usage and prohibit unauthorized users from gaining access to an elevator car with today's widespread use of multi-car elevator systems. Obviously, the problem of unauthorized usage is especially critical in landings above the main landing where security personnel are not routinely stationed.

For comprehensive protection, an elevator security system must control use of the elevator car in two different situations. First, the security system must detect a hall call initiated by an unauthorized user at any landing. The elevator system should not respond to such calls thereby preventing the unauthorized user from gaining access to an elevator car. Second, once an authorized user has entered an elevator car and initiated a car call to the desired landing, by actuating the proper switch, the security system must insure that the authorized user is permitted access to the landing selected. If the authorized user is prohibited access to the selected landing the car call should be disregarded. Furthermore, the security system should be designed such that unauthorized users do not gain access to an elevator car or landing by simply observing an authorized user entering a code or by obtaining the code through other deceptive means.

One prior art security system is disclosed in U.S. Pat. No. 3,388,376 wherein a car call is initiated by operation of a set of security call buttons in a coded sequence. Note that with this system an unauthorized passenger can gain access to a landing by learning a coded sequence for that landing, for instance, by simply observing an authorized user entering the code. Also, this prior art technique does not provide the first security function previously described, i.e., detecting and disregarding hall calls initiated by unauthorized users.

Another security system in widespread use today, especially in automatic banking machines, involves entering two code words or numbers. The first code, entered by keyboard or card reader, is simply an identifying code, e.g., a social security number or an account number. The second code known only to the user is then entered. If the identifying code and the secret code designate the same user, a positive identification is made. Such a security system, exemplified by U.S. Pat. No. 4,198,619, could be incorporated into an elevator system. Since this security system requires entry of two code words, it is less susceptible to false or incorrect identification as the prior art security system discussed above. It can, nevertheless, be circumvented by theft of a card when the thief knows or can learn the owner's secret code. Also note that both of these prior art security systems require the user to remember at least one code to operate the elevator system. Additional codes may have to be remembered for gaining access to specific landings served by the elevator system.

The present invention overcomes these disadvantages by providing access to an elevator system by analyzing the user's voice signal and comparing the results with the voice signals of all authorized users stored in memory. These and other advantages of the present invention are discussed below in the description of the preferred embodiments.

SUMMARY OF THE INVENTION

A voice-controlled elevator security system is disclosed. Authorized users provide template voice signals for digital storage in a memory. The user wishing to gain access to the elevator system provides a voice signal by simply reciting one or more of the words stored in the memory. The user's voice signal is digitized and compared with all the template voice signals to determine if a match exists between the user's voice signal and any of the template voice signals. The single template voice signal having the largest number of binary bits in agreement with the binary bits of the user's voice signal is indicated. The number of binary bits in agreement is compared with a predetermined limit and if the number in agreement exceeds this limit, an enable signal indicating the user is an authorized user is produced. The enable signal is used to control operation of the elevator system thereby controlling user access to an elevator car and to a specific landing serviced by the elevator system.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIGS. 5 through 19 are software flow charts illustrating the programming of the microprocessor shown in FIG. 1;

DESCRIPTION OF THE PREFERRED EMBODIMENT

Figure 1:
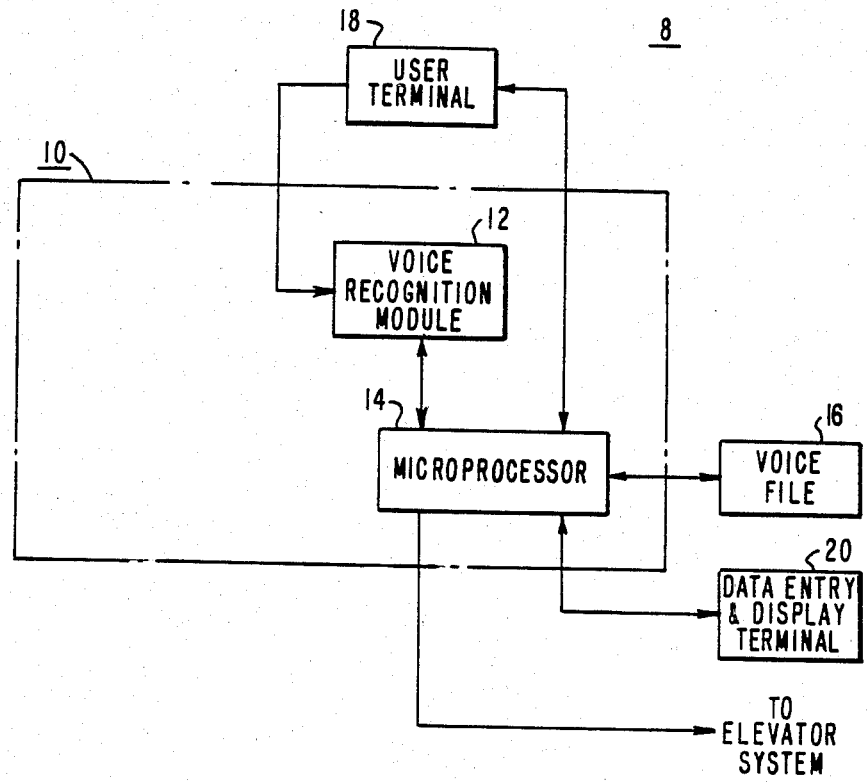
FIG. 1 is a block diagram of an elevator security system constructed according to the teachings of the present invention.
Figure 1A:
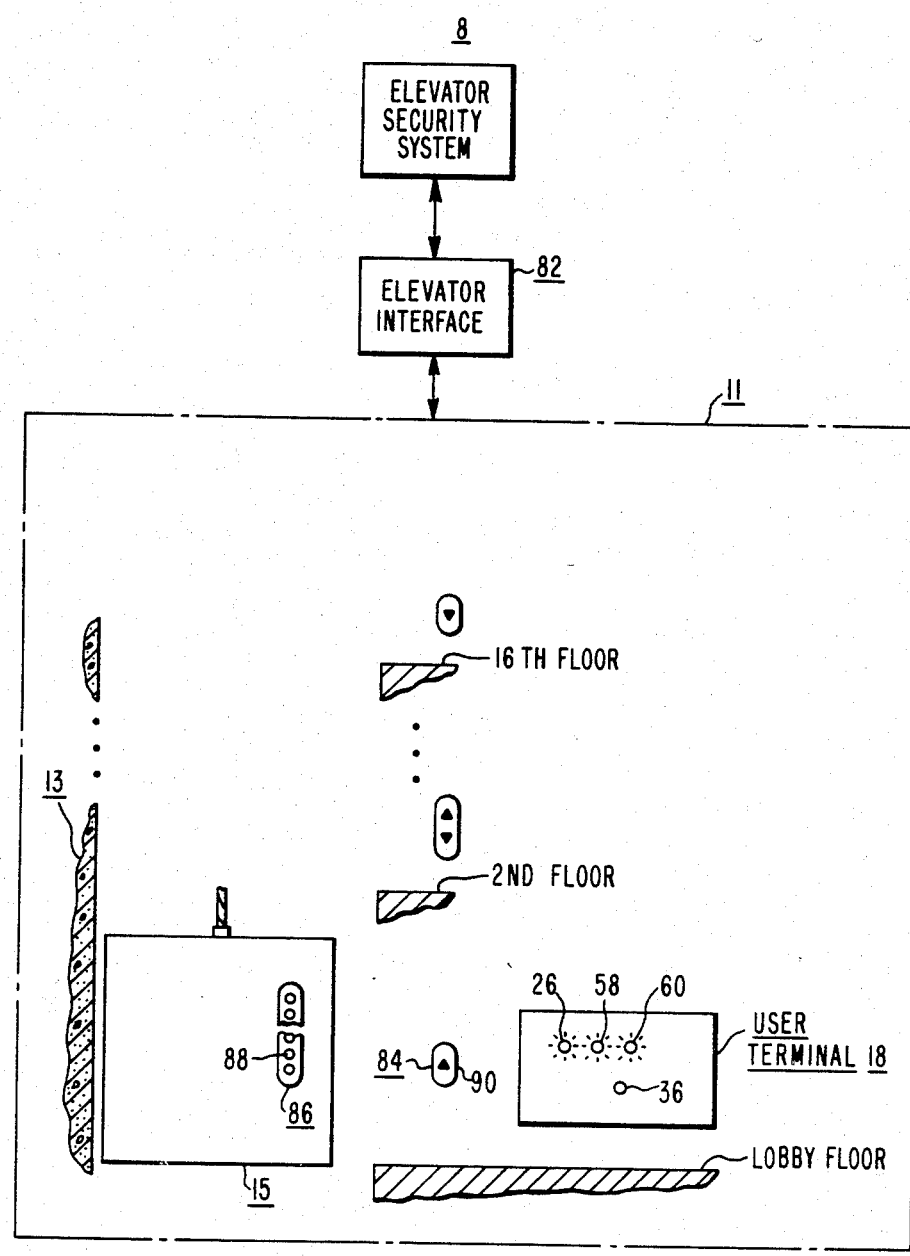
FIG. 1A is a diagrammatic representation of an elevator system which may be controlled by the elevator security system of the invention.

An elevator security system 8 constructed according to the teachings of the present invention is shown in FIG. 1. The elevator security system 8 comprises a main cabinet 10, a user terminal 18, a data entry and display terminal 20, and a voice file 16. An output signal from the main cabinet 10 controls an elevator system 11 (shown in FIG. 1A). The main cabinet 10 should be inaccessible to elevator users and should therefore be located in a secure area of a building 13 (FIG. 1A) serviced by the elevator system 11. The user terminal 18 should be located near the hall call switch 90 on the lobby or lowest floor serviced by the elevator system. The main cabinet 10 comprises a microprocessor 14 and a voice recognition module 12 which is bidirectionally responsive to the microprocessor 14.

The microprocessor 14 is also bidirectionally responsive to the voice file 16, the data entry and display terminal 20, and the user terminal 18. The voice recognition module 12 is responsive to the user terminal 18. The microprocessor 14 produces the control signals for controlling operation of the elevator system.

The voice-controlled elevator security system 8 controls an elevator system by comparing the words spoken by a person desiring to use the elevator system with template words previously spoken by all authorized users and stored in the voice-controlled elevator security system 8. If the spoken words match the stored template words, to a predetermined degree, a determination is made that the user is an authorized user and access to the elevator system is therefore gained. The microprocessor 14 controls operation of the voice-controlled elevator security system 8, and the voice recognition module 12 compares the spoken words of the user with the template words of all authorized users stored in the voice file 16.

In operation, a user utters a series of words at the user terminal 18 located on the lobby or lowest floor of the building being serviced by the elevator system. The words do not necessarily have to be grammatical English words; they can be any identifiable utterance from which significant characteristic features can be extracted. In the user terminal 18, the words are converted to an analog electrical signal which is input to the voice recognition module 12. Analog-to-digital conversion occurs in the voice recognition module 12. Template words are transferred from the voice file 16, a non-volatile memory, to the voice recognition module 12 via the microprocessor 14. In the voice recognition module 12 the template words are compared with the spoken words of the user. If there is sufficient agreement between the spoken words and the template words the voice recognition module 12 provides an appropriate signal to the microprocessor 14, and in turn the microprocessor 14 enters an up call at the hall call terminal 90 on the lowest or lobby floor. In addition, the microprocessor 14 enables only those car call switches in the elevator car representing the floors to which the authorized user is permitted access.

The data entry and display terminal 20 interacts with the microprocessor 14 to determine the mode in which the voice-controlled elevator security system 8 operates and to display status information. Obviously, before the voice-controlled elevator security system 8 can be operable, template words of the authorized users must be entered into the voice file 16. This is also accomplished using the data entry and display terminal 20.

Figure 2:
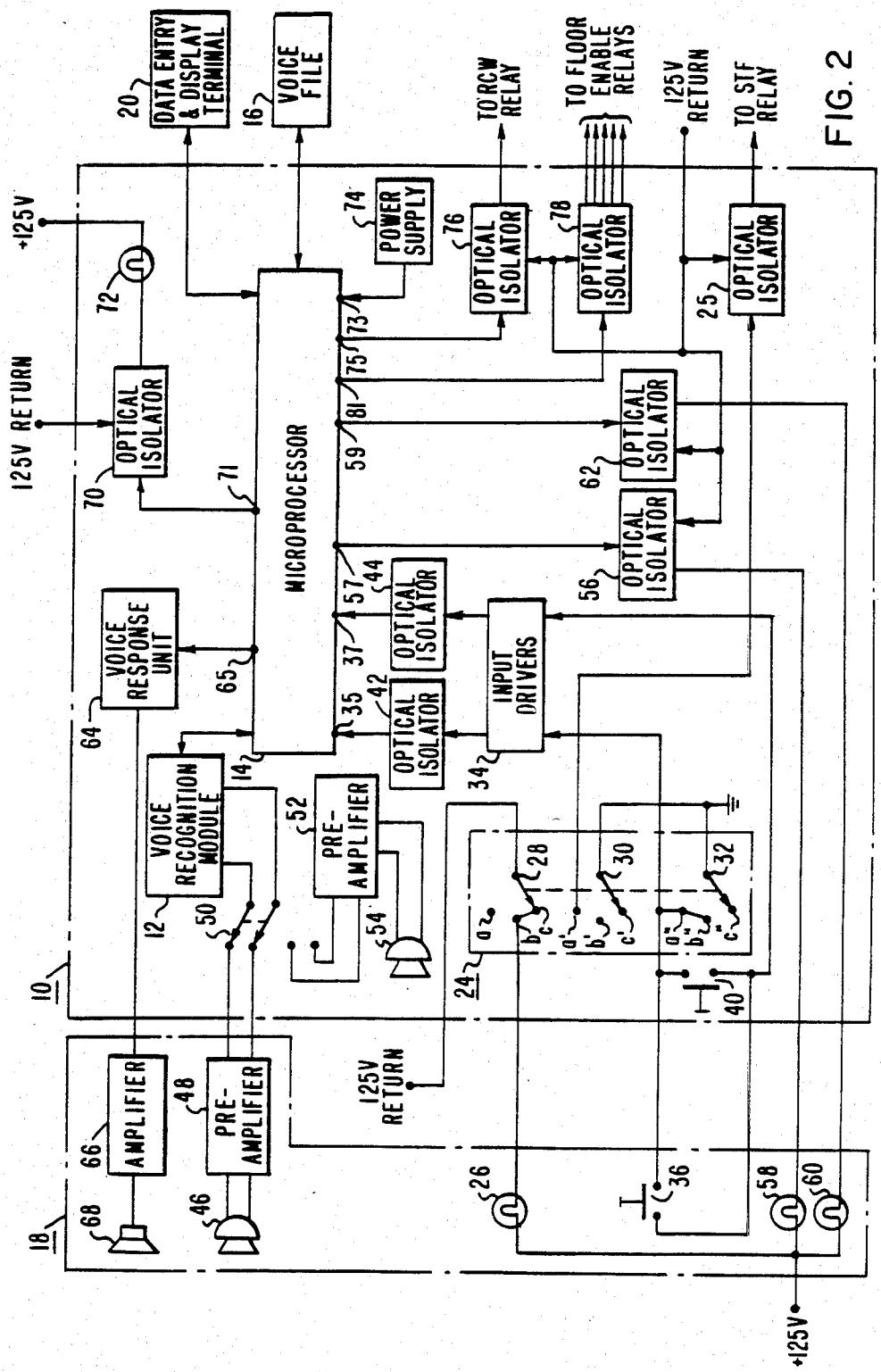
FIG. 2 is a partial schematic and partial block diagram of the elevator security system of FIG. 1.

FIG. 2 illustrates the voice-controlled elevator security system 8 in more detail. The components of FIG. 2 are identical in structure and function to the components bearing identical reference characters in FIG. 1. The mode switch 24, having three positions designated "a", "b", and "c", is located in the main cabinet 10 and determines the operational mode for the voice-controlled elevator security system 8. When the mode switch 24 is in position "a", the voice-controlled elevator security system 8 operates in a secure mode; the user terminal 18 and the main cabinet 10 are operational to determine if the user is an authorized user. In the secure mode, the microprocessor 14 provides appropriate signals to the elevator control system for control thereof. In position "b", the voice-controlled elevator security system 8 is in a train and test mode. In this mode the main cabinet 10 is activated, but no control over the elevator system is exercised. The train and test mode is used for loading the template words into the voice file 16, training a new user, updating the template words, and testing the voice-controlled elevator security system 8 to insure that the voice-controlled elevator security system 8 can properly identify authorized users. In the operational mode provided by position "c", the voice-controlled elevator security system 8 is deactivated and the elevator system functions in the normal manner. Detailed operation of the microprocessor 14 and the voice-controlled elevator security system 8 in each of these three operational modes will be discussed in greater detail in conjunction with the software flow charts of FIGS. 5 through 19.

Continuing with a description of the mode switch 24, a terminal b thereof is connected to a terminal c thereof, and the terminal b is connected to a positive 125 volt power supply (not shown in FIG. 2) via a VOICE OPERATION DEACTIVATED lamp 26. A wipe terminal 28 of the mode switch 24 is connected to a 125 volt power supply return circuit (not shown in FIG. 2). A terminal a' of the mode switch 24 is connected to an STF relay (not shown in FIG. 2) via an optical isolator 25. A ground terminal of the optical isolator 25 is connected to the positive 125 volt power supply return circuit. Operation of the STF relay will be discussed in conjunction with FIGS. 3 and 4. A wiper terminal 30 is connected to a wiper terminal 32 and is connected to ground. A terminal a" of the mode switch 24 is connected to: a terminal b", a first terminal of a pushbutton switch 36, a first terminal of a pushbutton switch 40, and a first input terminal of input drivers 34. A second terminal of the pushbutton switch 36 is connected to a second terminal of the pushbutton switch 40 and to a second input terminal of the input drivers 34. A first output terminal of the input drivers 34 is connected to an input terminal 35 of the microprocessor 14 via an optical isolator 42. A second output terminal of the input drivers 34 is connected to an input terminal 37 of the microprocessor 14 via an optical isolator 44. The input drivers 34 are used to provide a clean signal, free of contact bounce caused by the mode switch 24 and the pushbutton switches 36 and 40, to the optical isolators 42 and 44. The optical isolators 42 and 44 isolate the ground of an ±12 V power supply (not shown in FIG. 2), used by the input drivers 34, from the microprocessor 14.

When the mode switch 24 is in position "a" (the secure position) the wiper terminal 30 is connected to the terminal a', thereby grounding an input terminal of the optical isolator 25 and energizing the STF relay. In this position, the wiper terminal 32 is connected to the terminal a" grounding the first input terminal of the input drivers 34 and enabling the microprocessor 14. If the pushbutton switch 36 or the pushbutton switch 40 is depressed when the mode switch 24 is in position "a", the second input terminal of the input drivers 34 is temporarily grounded, thereby requesting operation of the microprocessor 14 in the voice recognition mode.

When the mode switch 24 is in position "b", the train and test mode, the wiper terminal 28 is connected to the terminal b, thereby lighting the VOICE OPERATION DEACTIVATED lamp 26 to indicate that the voice-controlled elevator security system 8 is not controlling the elevator system. The VOICE OPERATION DEACTIVATED lamp 26 is located in the user terminal 18 to advise the user of the status of the voice-controlled elevator security system 8. With the mode switch 24 in position "b", the STF relay is not energized and the elevator system is therefore not responsive to the voice-controlled elevator security system 8. Also, the wiper terminal 32 is connected to the terminal b" grounding the first input terminal of the input drivers 34 enabling the microprocessor 14, and readying the control terminal 10 for input of a spoken word. If the pushbutton switch 36 or the pushbutton switch 40 is depressed when the mode switch 24 is in position "b" the second input terminal of the input drivers 34 is temporarily grounded, thereby requesting operation of the microprocessor 14 in the voice recognition mode.

In position "c" (the normal mode) the wiper terminal 28 is connected to the terminal c to light the VOICE OPERATION DEACTIVATED lamb 26, indicating that the voice-controlled elevator security system 8 is not controlling operation of the elevator system. In this position the STF relay is not energized, and the microprocessor 14 is disabled since the input terminal 35 thereof is not enabled.

Continuing with the description of FIG. 2 a microphone 46 is responsive to spoken words of the user. A preamplifier 48 is responsive to the microphone 46, and when a switch 50 is in a first position the voice recognition module 12 is responsive to the preamplifier 48. A preamplifier 52 is responsive to a microphone 54, and when the switch 50 is in a second position the voice recognition module 12 is responsive to the preamplifier 52. The microphone 54 and the preamplifier 52 are located in the main cabinet 10 and are used for training and testing proper operation of the voice-controlled elevator security system 8. The microphone 46 and the preamplifier 48 are located in the user terminal 18 for use only in the secure operating mode.

An input terminal of an optical isolator 56 is connected to an output terminal 57 of the microprocessor 14. A ground terminal of the optical isolator 56 is connected to the 125 volt power supply return circuit. A first terminal of a PROMPT lamp 58 is connected to an output terminal of the optical isolator 56; a second terminal of the PROMPT lamp 58 is connected to a first terminal of a RECOGNITION CONFIRMED lamp 60 and to the positive 125 volt power supply. A second terminal of the RECOGNITION CONFIRMED lamp 60 is connected to an output terminal of an optical isolator 62; an input terminal of the optical isolator 62 is connected to an output terminal 59 of the microprocessor 14. A ground terminal of the optical isolator 62 is connected to the 125 volt power supply return circuit.

In response to the microprocessor 14, the PROMPT lamp 58 and the RECOGNITION CONFIRMED lamp 60, which are located in the user terminal 18, provide status information to the user. A steady glow from the PROMPT lamp 58 indicates that the user is to speak the next word in the sequence of words; a flashing signal from the PROMPT lamp 58 indicates that the user is to repeat the previously spoken word. This repetition enables the voice-controlled elevator security system 8 to re-evaluate the word to determine whether the user is an authorized user. The RECOGNITION CONFIRMED lamp 60 glows steadily when the voice-controlled elevator security system has determined that the user is an authorized user. The optical isolators 56 and 62 isolate the 125 volt power supply circuitry from the microprocessor 14.

A voice response unit 64 is responsive to an output terminal 65 of the microprocessor 14. A speaker 68 is responsive to the voice response unit 64 via an amplifier 66. The amplifier 66 and the speaker 68 are located in the user terminal 18. The voice response unit 64, the amplifier 66, and the speaker 68 are used as an alternative to the PROMPT lamp 58 for prompting the user to recite the words. The microprocessor 14 produces a signal on the output terminal 65 thereof instructing the voice response unit 64 to provide an electrical signal representative of the prompting word, i.e., the word to be spoken by the user. This electrical signal is amplified by the amplifier 66 and transformed to an acoustical signal by the speaker 68.

An input terminal of an optical isolator 70 is connected to an output terminal 71 of the microprocessor 14 and a ground terminal of the optical isolator 70 is connected to the 125 volt power supply return circuit. A first terminal of a tamper alarm lamb 72 is connected to an output terminal of the optical isolator 70; a second terminal of the tamper alarm lamp 72 is connected to the positive 125 volt power supply. The tamper alarm lamp 72 is a tamper lamp which is lit, on command from the microprocessor 14, when the user has exceeded a predetermined number of attempts allowed in the recognition process. The optical isolator 70 isolates the 125 volt power supply circuitry from the microprocessor 14.

An input terminal 73 of the microprocessor 14 is connected to a power supply 74 for providing DC operating power. An input terminal of an optical isolator 76 is connected to an output terminal 75 of the microprocessor 14. An output terminal of the optical isolator 76 is connected to a first terminal of an RCW relay coil (not shown) in FIG. 2. The RCW relay will be discussed in conjunction with FIGS. 3 and 4. A ground terminal of the optical isolator 76 is connected to the positive 125 volt power supply return circuit. An output terminal 81 of the microprocessor 14 is connected to an input terminal of an optical isolator 78. The optical isolator 78 has a plurality of output terminals which are connected to an elevator interface unit 82, shown in FIGS. 3 and 4 and to be discussed in conjunction therewith. A ground terminal of the optical isolator 78 is connected to the positive 125 volt power supply return circuit. The optical isolators 76 and 78 isolate the 125 volt power supply circuitry from the microprocessor 14.

Figure 3:
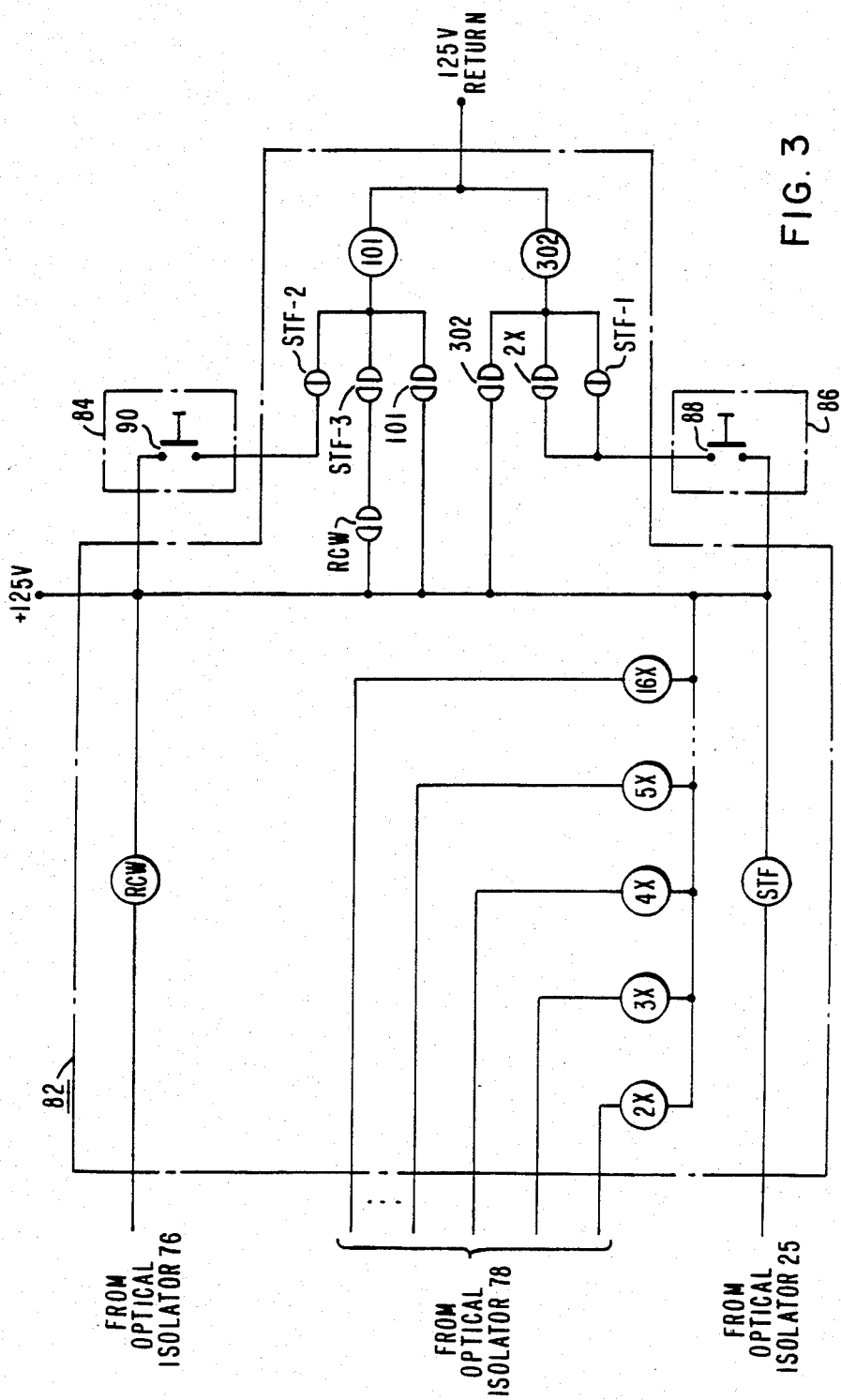
FIG. 3 is a block diagram of an interface unit to interface the elevator security system of FIG. 1 with the elevator control system.

Turning to FIG. 3, there is shown an elevator interface unit 82, a first floor hall call terminal 84 and a car call terminal 86. A first terminal of the STF relay coil, located in the elevator interface unit 82, is responsive to the mode switch 24 through the optical isolator 25. A second terminal of the STF relay coil is connected to the positive 125 volt power supply (not shown in FIG. 3). A second floor car call switch 88, located in the car call terminal 86, is representative of the car call switches in the elevator car 15 (FIG. 1A) being controlled by the voice-controlled elevator security system 8. A first terminal of the second floor car call switch 88 is connected to the second terminal of the STF relay coil. A second terminal of the second floor car call switch 88 is connected to a first terminal of a relay coil 302 via a parallel combination of a normally-open relay contact 2X and a normally-closed relay contact STF-1. A second terminal of the relay coil 302 is connected to the 125 volt power supply return circuit (not shown in FIG. 3).

A plurality of floor relays 2X through 16X each represent a floor in the building serviced by the elevator system. A first terminal of each of the plurality of floor relays 2X through 16X is connected to a respective output terminal of the optical isolator 78 (not shown in FIG. 3); a second terminal of each of the plurality of floor relays 2X through 16X is connected to the 125 volt power supply.

In operation, when the mode switch 24 is placed in the "a" or secure position, the STF relay coil is energized and the normally closed relay contact STF-1 is open. If the user is an authorized user and is permitted access to the second floor, the microprocessor produces an appropriate signal at the output terminal 81 thereof. The signal is input to the optical isolator 78 for producing a signal to energize the relay coil 2X, thereby closing the relay contact 2X. When the relay contact 2X is closed, the authorized user can enter a car call for the second floor by depressing the second floor car call switch 88. This energizes the relay coil 302 which in turn controls the elevator car 15, in a manner not shown in FIG. 3, such that the elevator car 15 will stop at the second floor allowing the authorized user to exit. The floors to which each authorized user is permitted access are stored in the voice file 16; entry of this information to the voice file 16 is discussed in conjunction with the flow chart of FIG. 18.

A relay contact 302 is connected between the positive 125 volt power supply and the first terminal of the relay coil 302. The relay contact 302 closes when the relay coil 302 is energized and holds the relay coil 302 in the latched position after the authorized user has released the second floor car call switch 88.

When the voice-controlled elevator security system 8 is not in the secure mode, the STF relay coil is deenergized and the relay contact STF-1 is closed. This configuration allows the elevator system to operate normally whereby a second floor car call can be entered by any user at the second floor car call switch 88 to activate the relay coil 302.

The first terminal of the relay coil RCW is connected to the optical isolator 76 (not shown in FIG. 3), and a second terminal of the relay coil RCW is connected to the positive 125 volt power supply. A first terminal of a lobby floor up hall call switch 90 is connected to the positive 125 volt power supply and a second terminal thereof is connected to a first terminal of a normally-closed relay contact STF-2. The lobby floor up hall call switch 90 is in the lobby floor hall call terminal 84. A second terminal of the relay contact STF-2 is connected to a first terminal of a relay coil 101. A second terminal of the relay coil 101 is connected to the 125 volt power supply return circuit. A first terminal of a relay contact RCW is connected to the positive 125 volt power supply and a second terminal thereof is connected to a first terminal of a relay contact STF-3. A second terminal of the relay contact STF-3 is connected to the first terminal of the relay coil 101. The first terminal of the relay coil 101 is also connected to the positive 125 volt power supply via a relay contact 101.

A signal from the optical isolator 76 energizes the relay RCW when a user has been identified as an authorized user. If the mode switch 24 is in the secure mode, thereby energizing the relay coil STF, the relay contacts RCW and STF-3 are closed. Closure of the relay contacts RCW and STF-3 energizes the relay coil 101 producing an up hall call at the lobby floor hall call terminal 84. The elevator control system 11 responds to this up hall call in a manner not shown in FIG. 3. Upon entering the elevator car 15, the authorized user can actuate a car call switch, such as the second floor car call switch 88, for the floors to which the authorized user is permitted access.

If the voice-controlled elevator security system 8 is not in the secure mode, the relay coil STF is deenergized and the relay contact STF-2 is closed. The elevator system then operates in the unsecured mode such that any user can depress the lobby floor up hall call switch 90 to enter an up hall call at the lobby floor. This action energizes the relay coil 101, thereby entering an up hall call for the lobby floor. When the relay coil 101 is energized, the relay contact 101 is closed. When the lobby floor up hall call switch 90 is released, closure of the relay contact 101 keeps the relay coil 101 in an energized state.

Figure 4:
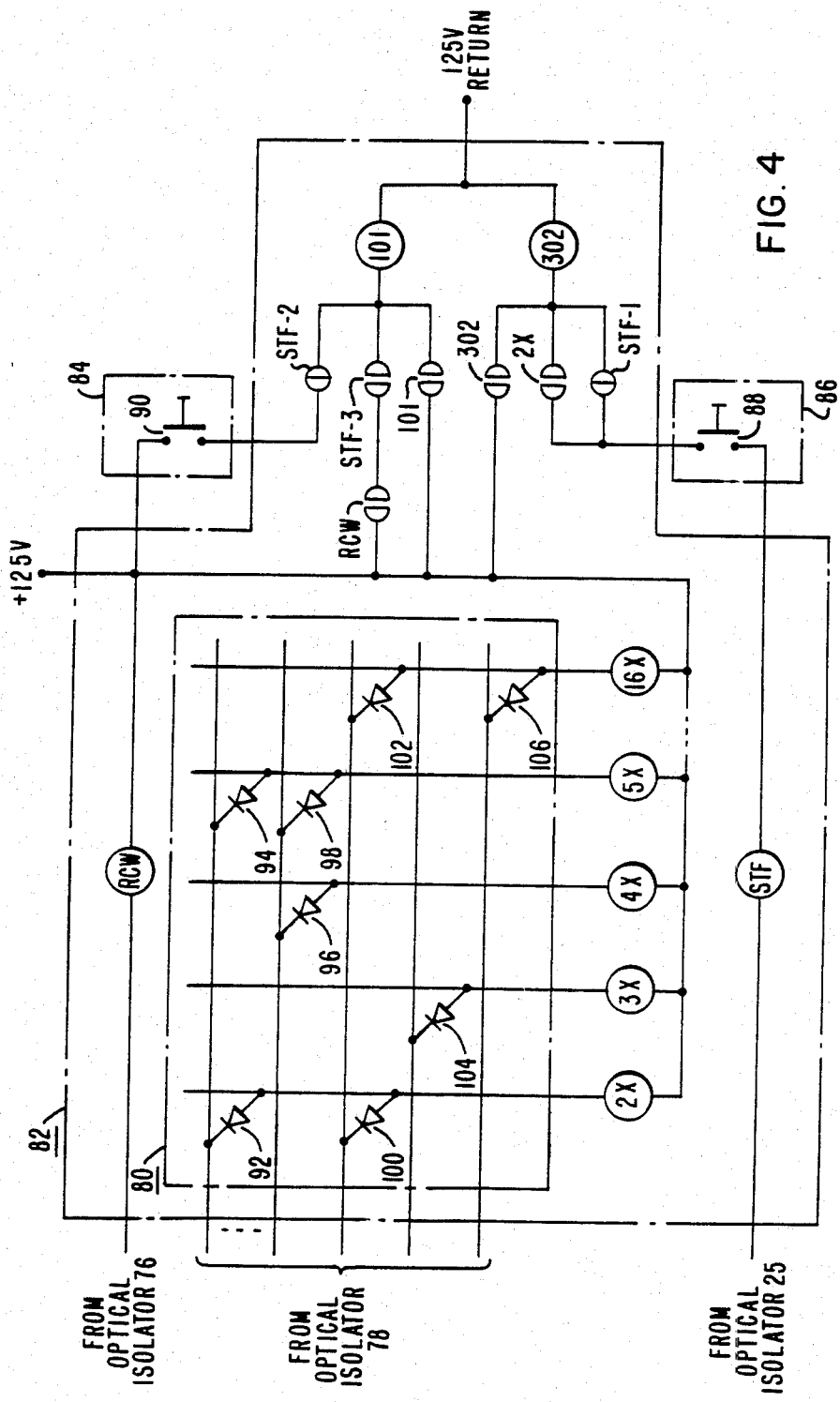
FIG. 4 is a block diagram of an alternative embodiment of the interface unit of FIG. 3.

FIG. 4 illustrates a second embodiment of the elevator interface unit 82 including a floor enable matrix 80. The floor enable matrix 80 is used in lieu of the software for energizing the appropriate floor relays 2X through 16X for each authorized user. The components of FIG. 4 are identical in structure and function to the components bearing identical reference characters in FIG. 3.

The floor enable matrix 80 identifies the floors of the building 15 serviced by the elevator system 11 to which each authorized user is permitted access. Each authorized user is given a user number to be used with the floor enable matrix 80. Although it is unnecessary for the authorized user to recite, or even remember the user number, when the user is identified as an authorized user the microprocessor 14 inputs a signal representative of the user number to the floor enable matrix 80 via the optical isolator 78. The signal is used by the floor enable matrix 80 to enable the appropriate car call switches, via the relay coils 2X through 16X, such as the second floor car call switch 88. The user number is also used to identify the user's template words for loading into and unloading from the voice file 16, the microprocessor 14 and the voice recognition module 12. An exemplary configuration for the floor enable matrix 80 is shown in FIG. 3. In this example, it is assumed that there are five authorized users and sixteen floors in the building.

In the floor enable matrix 80, a cathode terminal of a diode 92 and a cathode terminal of a diode 94 are connected to a first terminal of an optical isolator 78. An anode terminal of diode 92 is connected to a first terminal of the floor relay 2X; an anode terminal of the diode 94 is connected to a first terminal of the floor relay 5X. A cathode terminal of a diode 96 and a cathode terminal of a diode 98 are connected to a second terminal of the optical isolator 78. An anode terminal of the diode 96 is connected to a first terminal of the floor relay 4X; an anode terminal of the diode 98 is connected to the first terminal of the floor relay 5X. A cathode terminal of a diode 100 and a cathode terminal of a diode 102 are connected to a third terminal of the optical isolator 78. An anode terminal of the diode 100 is connected to the first terminal of the floor relay 2X; an anode terminal of the diode 102 is connected to a first terminal of the floor relay 16X. A cathode terminal of the diode 104 is connected to a fourth terminal of the optical isolator 78. An anode terminal of the diode 104 is connected to a first terminal of a floor relay 3X. A cathode terminal of a diode 106 is connected to a fifth terminal of the optical isolator 78. An anode terminal of the diode 106 is connected to the first terminal of the floor relay 16X. Second terminals of the floor relays 2X, 3X, 4X, 5X and 16X are connected to the 125 volt power supply return circuit.

The floor enable matrix 80 functions as follows. When the mode switch 24 is in position "a" (the secure mode) and the user has been identified as the first authorized user, a signal from the first terminal of the optical isolator 78 forward biases the diodes 92 and 94, thereby energizing the floor relays 2X and 5X. When the floor relay 2X is energized, the relay contact 2X is closed. In this configuration, when the second floor car call switch 88 is activated by the first authorized user, the relay coil 302 is energized producing a second floor car call signal for the elevator control system. Energization of the floor relay 5X closes a relay contact 5X (not shown in FIG. 3) thereby allowing a relay coil for a fifth floor car call signal (not shown in FIG. 3) to be energized when the first authorized user actuates a fifth floor car call switch (not shown in FIG. 3). If the first authorized user activated a floor car call switch for the third floor (not shown in FIG. 3) a relay coil responsive thereto will not be energized because a relay contact associated therewith remains open. In this manner, the first authorized user is permitted access to only the first and fifth floors of the building. As can be seen, the second authorized user in the example shown in FIG. 4 is permitted access to the fourth and fifth floors. The third authorized user is permitted access to the second and sixteenth floors; the fourth authorized user is permitted access to the third floor; the fifth authorized user is permitted access to the sixteenth floor. Of course, the floor enable matrix can be easily modified to accommodate all access patterns for any number of authorized users and building floors.

As previously discussed, the voice-controlled elevator security system 8 has three operational modes. When the mode switch 24 is in the "c" position, referred to as the normal mode, the voice-controlled elevator security system is deactivated and the elevator system operates in the normal manner to allow all users access to all building floors. In the train and test mode, position "b" for the mode switch 24, the elevator system operates in the normal manner. However, the voice-controlled elevator security system 8 is activated. Also, the RCW relay and the floor relays (2X through 16X) can be energized, when recognition is confirmed, but the relay RCW and the floor relays do not control operation of the elevator system because the relay contacts STF-1 and STF-2 remain closed. When the mode switch 24 is in the "a" position, the secure mode, the STF relay coil is energized, thereby permitting the voice-controlled elevator security system 8 to be completely operative to control the elevator system via the RCW and floor relays.

When operating in the train and test or secure mode, the microprocessor 14 performs several functions in support of these operational modes. A brief summary of each of these functions follows; each will be discussed in greater detail in conjunction with the software flow charts of FIGS. 5 through 19.

The TRAIN function provides means of extracting the characteristic features from the words and storing them in digitized form in the voice recognition module 12. As the name implies, this function is used to load the template words of the authorized users into the voice recognition module 12. To accomplish this, the authorized user, with the assistance of the operator, repeats the spoken words in a specified sequence as prompted by messages on the data entry and display terminal 20. The UPDATE function allows the authorized user, again with the assistance of the operator, to modify the template words stored in the voice recognition module 12. This is accomplished on a selective basis without affecting all the template words of the authorized user stored in the voice recognition module 12.

The UPLOAD function transfers the template words from the voice recognition module 12 to a random access memory in the microprocessor 14. The DOWNLOAD function transfers the template words from the random access memory in the microprocessor 14 to the voice recognition module 12. The TRANSFER TO VOICE FILE (TTOVF) function transfers the template words from the random access memory in the microprocessor 14 to the non-volatile voice file 16. The RETRIEVE FROM VOICE FILE (RFRVF) function transfers the template words from the voice file 16 to the random access memory in the microprocessor 14.

The SETREJECT function permits adjustment of the comparison criteria used by the voice recognition module 12 to determine whether the user's spoken word matches one of the template words. The SETREJECT function is always used in conjunction with the RECOGNIZE function to be discussed hereinbelow.

The RECOGNIZE function is the primary function for the voice-controlled elevator security system 8. The user requests operation of the voice-controlled elevator security system by activating the switch 36 located in the user terminal 18. The microprocessor 14 responds with an optical prompt signal from the PROMPT lamp 58 or a voice prompt signal through the speaker 68. The user then pronounces the first word previously stored in the voice recognition module 112 into the microphone 46. The PROMPT lamp 58 indicates whether the spoken word has been accepted or rejected (i.e., whether the spoken word matches one of the template words within the dictates of the acceptance/rejection criteria). If the spoken word is accepted, the PROMPT lamp 58 is steadily lit, indicating that the user is to recite the next word in the series. If the work is rejected, the PROMPT lamp 58 flashes, indicating that the user is to repeat the previous word. If each word in a series of spoken words is accepted within a prescribed number of attempts, the RECOGNITION CONFIRMED lamp 60 lights to confirm recognition of the user as an authorized user. As an alternative, a recognition signal from the speaker 68 may be provided. Upon recognition of the authorized user, the microprocessor 14 through the optical isolator 78, enables the floor relays for which the authorized user has access. If the prescribed number of attempts at matching the spoken word with a template word has been exceeded, the tamper alarm lamp 72 is activated.

The TEST function is performed immediately after the TRAIN function to insure the adequacy of the training process. The TEST function bears a close resemblance to the recognize function, except the former does not provide control of the elevator system. The SELECT-FLOOR-ACCESS (FLORMA) function allows each authorized user to select and enter the floors to which the authorized user is permitted access.

Figure 5:
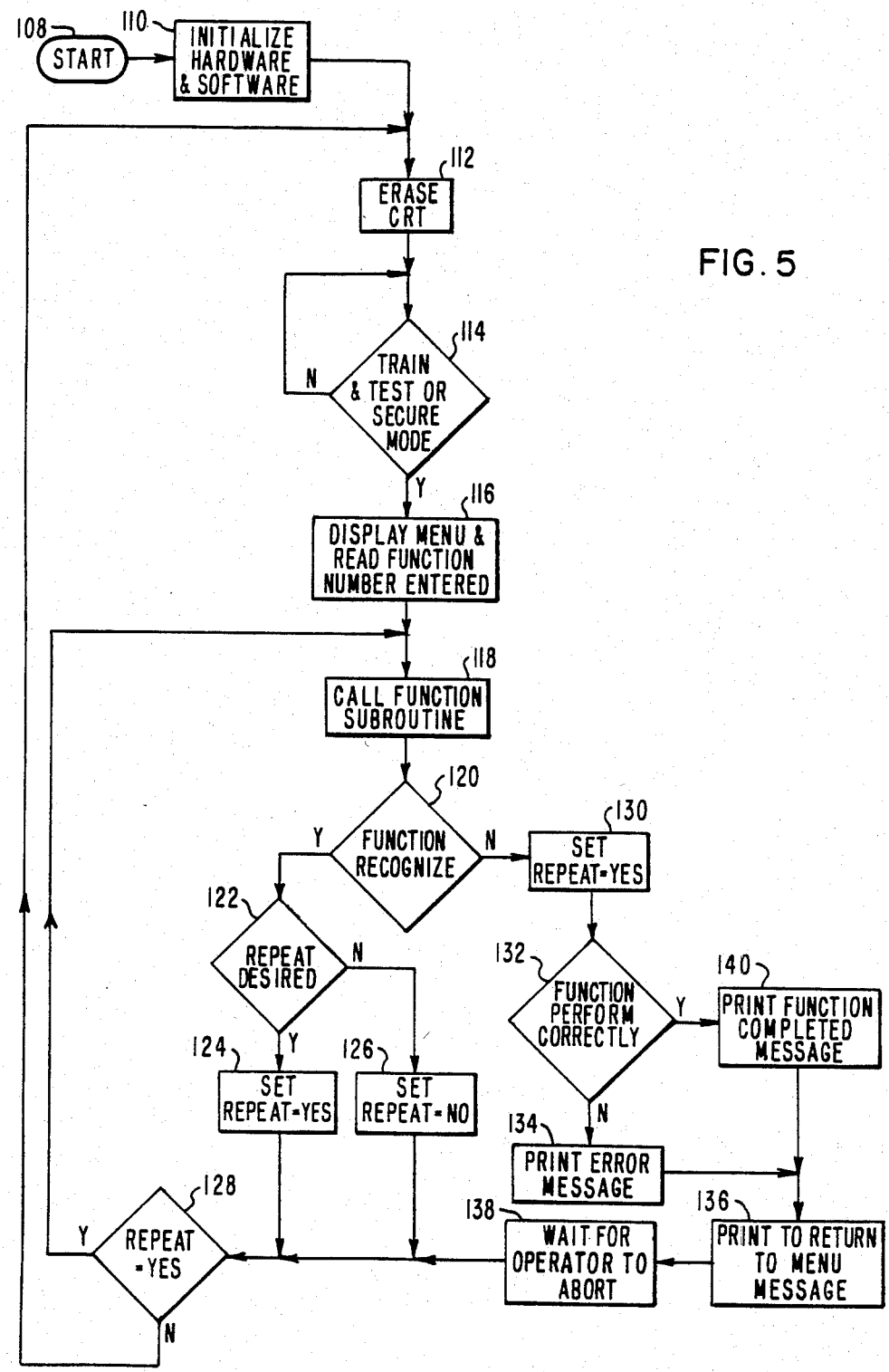

Referring now to FIG. 5, there is shown a flow chart of the main operating program routine for the voice-controlled elevator security system 8. The program begins at an entry point 108 and the hardware and software are initialized at a step 110. After the cathode ray tube of the data entry and display terminal 20 is erased at a step 112, the program determines whether the mode switch 24 is in the train and test or secure position at a decision step 114. If the result at the decision step 114 is negative, processing returns to an entry point for the decision step 114. If the result at the decision step 114 is affirmative, the program continues to a step 116 where a menu of the available functions is displayed on the data entry and display terminal 20, a function designating number is then entered by the operator at the data entry and display terminal 20. At a step 118, a SELECT function, for determining the operating function for the voice-controlled elevator security system 8, is called. The SELECT function will be discussed in greater detail in conjunction with FIG. 6. At a decision step 120, a determination is made regarding whether the operating function is the RECOGNIZE function. If the answer is affirmative, processing continues at a decision step 122 where the program determines if a repeat is desired. If a repeat is desired, the repeat variable is set equal to YES at a step 124; if a repeat is not desired, the repeat variable is set equal to NO at a step 126. A decision step 128 determines whether the repeat variable equals YES. In other functions of the voice-controlled elevator security system 8 to be discussed subsequently, the repeat variable is set equal to YES when a user is recognized as an authorized user or rejected; repeat is set equal to NO when the operator aborts the program. If the decision at the decision step 128 is yes, processing returns to an entry point immediately preceding the step 118 to prepare the voice-controlled elevator security system 8 for evaluation of another user. If the determination at the decision step 128 is negative, processing returns to an entry point immediately preceding the step 112.

If the result of the decision step 120 is negative, indicating the operating function is not the RECOGNIZE function, the repeat variable is set equal to YES at a step 130. A decision step 132 determines whether the operating function performed correctly and if this was not the case, an error message is printed at a step 134. If the operating function did perform correctly, a function completion message is printed at a step 140. After printing the appropriate message, processing continues at a step 136 where a message explaining how to return to the menu display is printed. The program then waits for the operator to abort at a step 138. After the operator has done so, processing continues through the decision step 128 causing the function menu to again be displayed.

Figure 6:
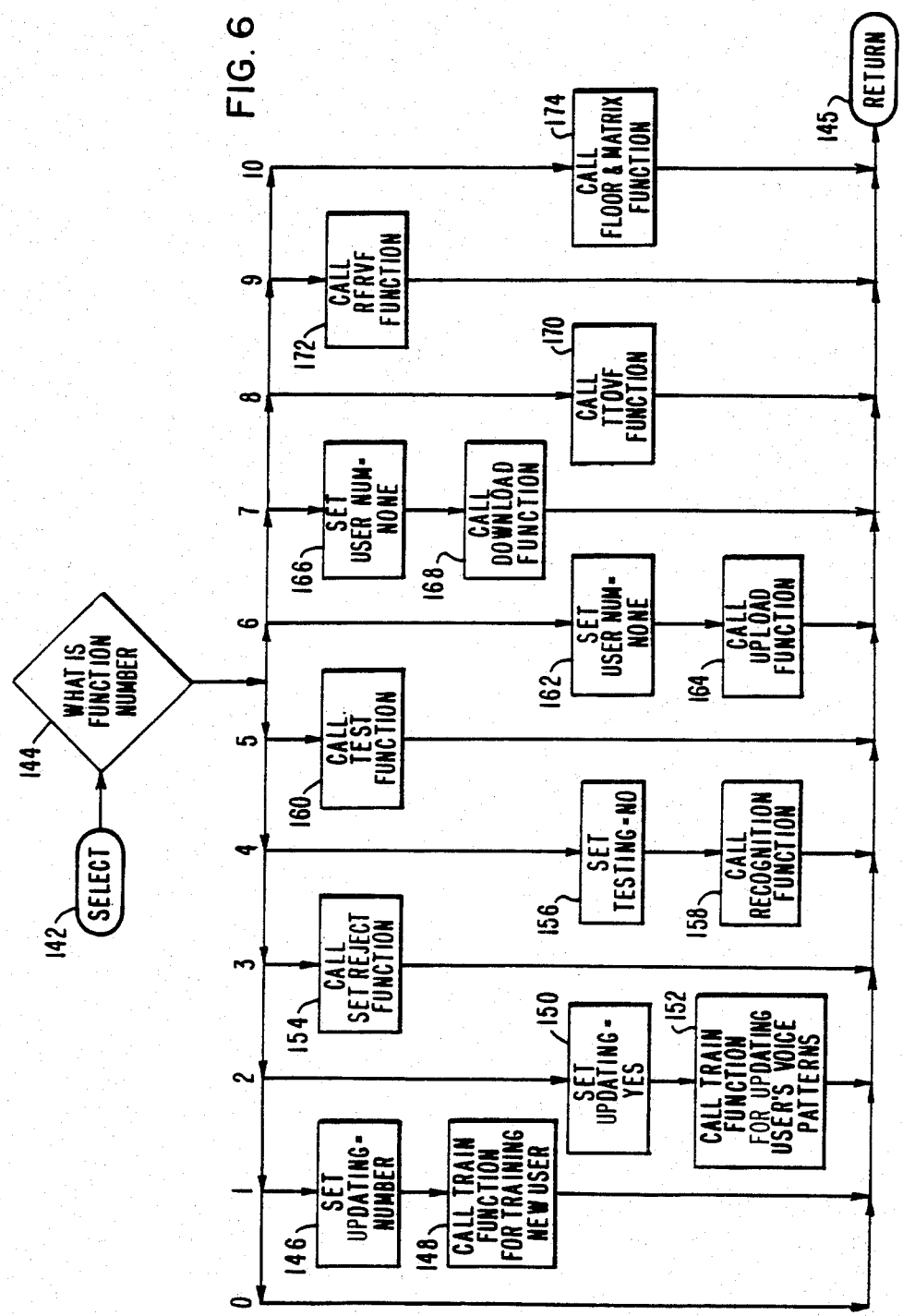

The SELECT function is illustrated in FIG. 6. Processing begins at an entry point 142 and continues at a decision step 144 where the program determines the function number entered by the operator at the data entry and display terminal 20. If the number zero has been entered, processing returns to the main routine via an exit point 145. If the operator enters the number one, processing continues at a step 146, where the variable UPDATING is set equal to NUMBER. The program then continues to a step 148 where the TRAIN function is called for training a new authorized user. The TRAIN function will be discussed in conjunction with FIG. 7. If the operator enters the number two, the program moves to a step 150 where the variable UPDATING is set equal to YES. Processing continues at a step 152 where the TRAIN function is called for updating an authorized user's voice patterns. If the operator enters the number three, processing continues at a step 154 where the SETREJECT function is called. The SETREJECT function will be discussed in conjunction with FIGS. 8 and 9. The number 4 sets a variable TESTING to NO in step 156, and step 158 calls the RECOGNITION function. The TEST function is called at a step 160 when the operator enters the numeral five. The TEST function will be discussed subsequently in conjunction with FIG. 13.

Figure 18:
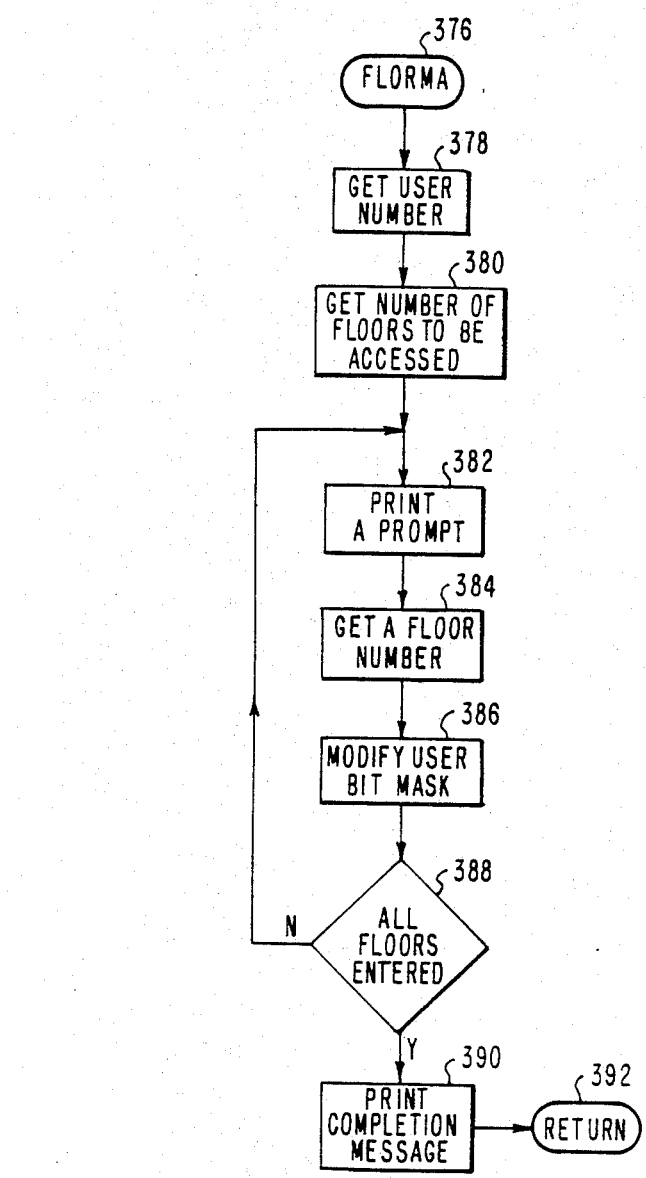

If the operator enters the numeral six, processing moves to a step 162 where the variable USER NUM is set equal to NONE and then continues at a step 164 where the UPLOAD function is called. The UPLOAD function is shown in detail in FIG. 14. If the numeral seven is entered by the operator, the variable USER NUM is set equal to NONE at a step 166 and the DOWNLOAD function is called at a step 168. The DOWNLOAD function is discussed in FIG. 15. The operator's entry of the numeral eight causes the TTOVF function to be called at a step 170. The TTOVF function, shown in FIG. 16, transfers template words from the voice recognition module 12 to the voice file 16 via the microprocessor 14. The numeral nine indicates that the RFRVF function is to be called at a step 172. The RFRVF function transfers template words from the voice file 16 to the voice recognition module 12 via the microprocessor 14. The RFRVF function is illustrated in FIG. 17. Lastly, if the operator enters the numeral ten, a FLORMA function is called at a step 174. The FLORMA function, illustrated in FIG. 18, is utilized to enter the floor numbers to which each authorized user is permitted access.

As shown in FIG. 6, after each of the functions is called and executed, processing returns to the main program via the exit point 145.

Figure 7:
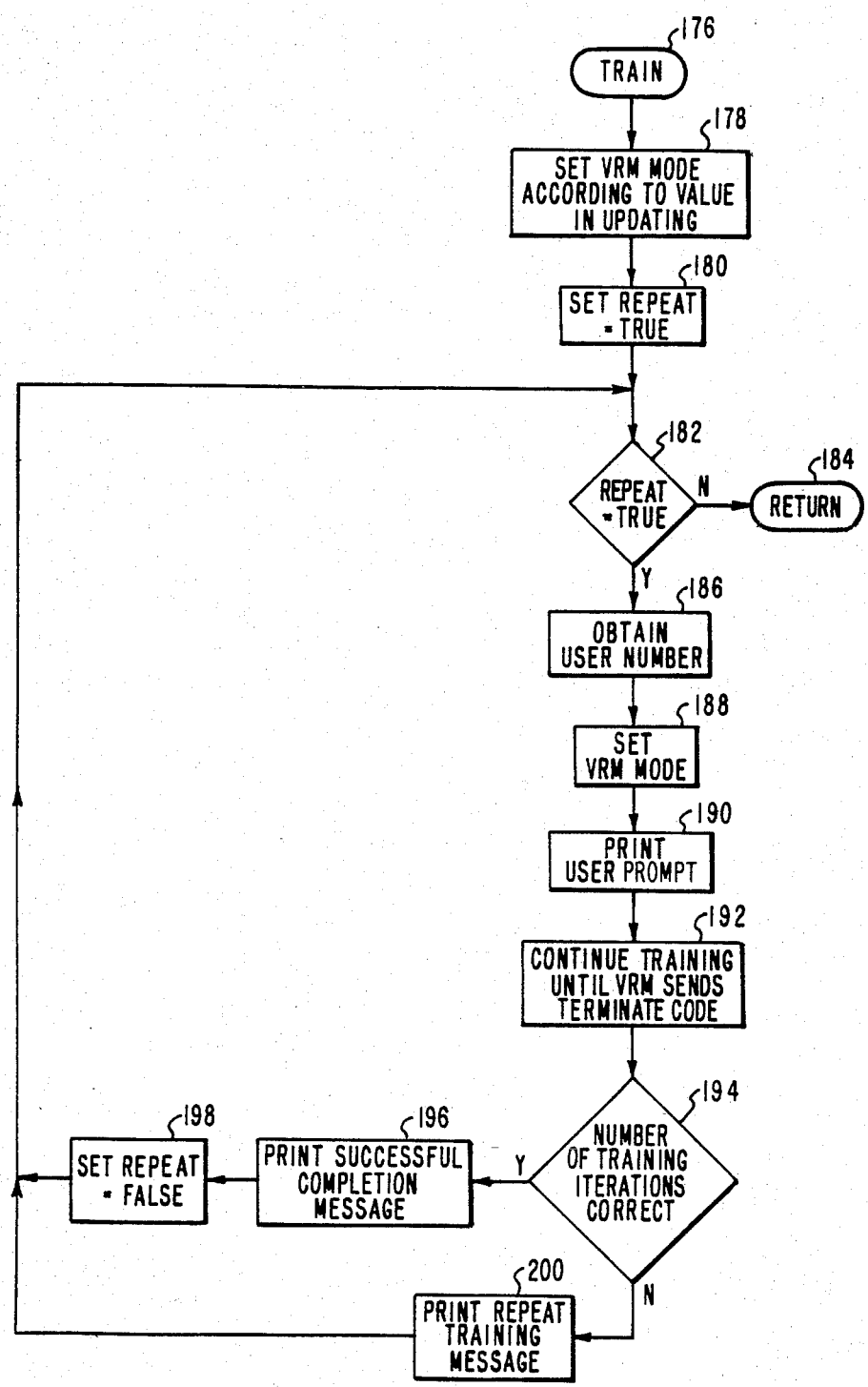

FIG. 7 illustrates in detail the TRAIN function. As discussed in FIG. 6, the TRAIN function is called when the function number entered by the operator is a one or a two. The TRAIN function is entered at an entry point 176 followed by a step 178 where the voice recognition module 12 is initialized in accordance with the value of the variable UPDATING. This value is established during the SELECT function shown in FIG. 6. At a step 180, the variable REPEAT is set equal to TRUE, and at a decision step 182 a determination is made regarding whether the REPEAT variable is equal to TRUE. If the decision at the decision step 182 is yes, processing continues at a step 186 wherein the authorized user's number is entered by the operator. At a step 188 the operating mode of the voice recognition module 12 is set, and at a step 190, the user is prompted to recite the template words in sequence. The words must be repeated several times to insure that accurate voice patterns are stored in the voice recognition module 12.

The continuation of the training process, depicted at a step 192, is terminated when the voice recognition module 12 sends a termination code indicating completion of the requested number of repetitions through the template word sequence.

As a means of double-checking that a sufficient number of passes through the template word sequence has been completed, a decision step 194 determines whether the number of training passes is correct. If the answer from the decision step 194 is negative a repeat-training message is printed at a step 200 and processing returns to an entry point immediately preceding the decision step 182. If the required number of passes has been completed the answer at the decision step 194 is affirmative and processing moves to a step 196 where a successful-completion message is printed on the data entry and display terminal 20. The REPEAT variable is set equal to FALSE at a step 198 and processing then continues at an entry point immediately preceding the decision step 182. When the training process is complete the repeat variable is FALSE and processing returns to the main program via the exit point 184.

Figure 8:
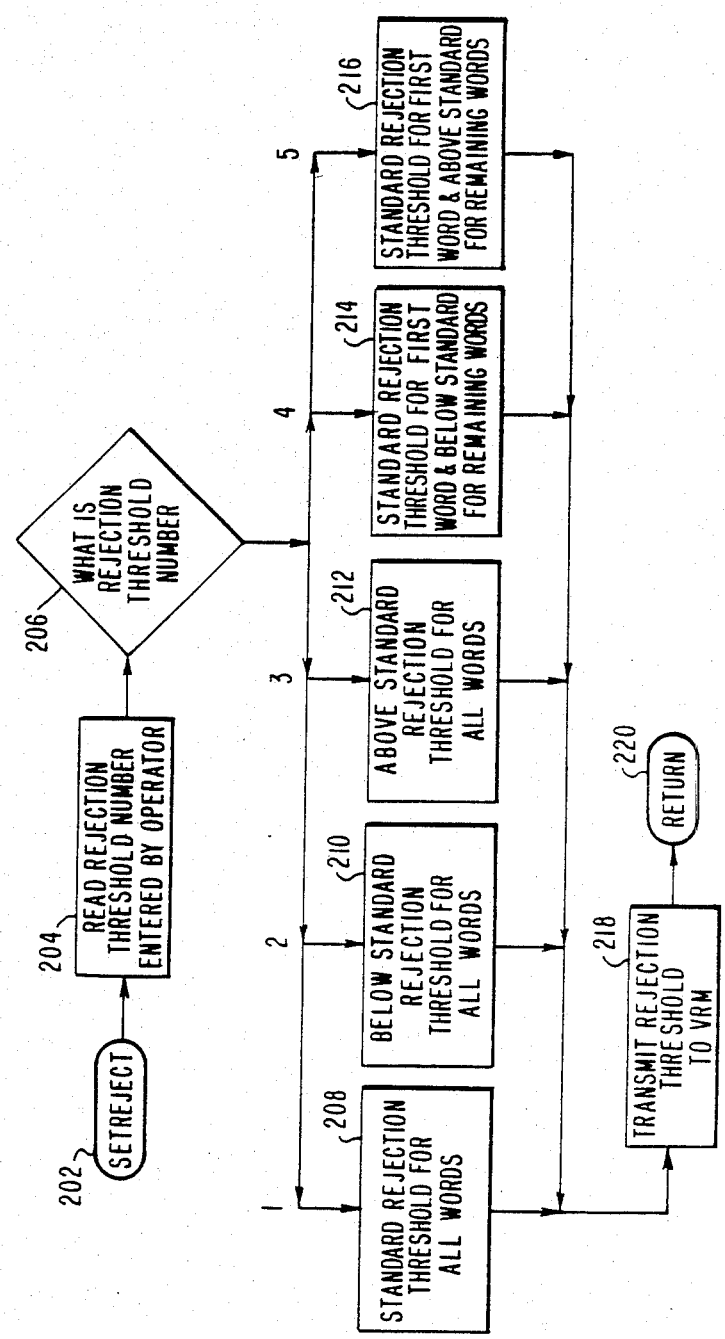

FIG. 8 illustrates the SETREJECT function for the voice-controlled elevator security system 8. The SETREJECT function allows the operator to determine the rejection threshold used by the voice recognition module 12 in comparing the spoken words with the template words. Processing in the SETREJECT function begins at an entry point 202 and proceeds to a step 204 where the program reads the rejection threshold number entered by the operator at the data entry and display terminal 20. At a decision step 206 the program determines the rejection threshold number entered by the operator. If the operator enters the numeral one a standard rejection threshold is used for all words, as illustrated at a step 208. If the numeral two is entered by the operator, the voice recognition module 12 uses a below standard rejection threshold for all words; see a step 210. Processing continues at a step 212 if the operator enters numeral three. Entry of the numeral three causes an above-standard rejection threshold to be used for all words. If the numeral four is entered by the operator, a step 214 causes the voice recognition module 12 to use the standard rejection threshold for the first word and the below-standard rejection threshold for the remaining words of the series. Entry of the numeral five continues processing at a step 216 wherein the standard rejection threshold is used for the first word and the above-standard rejection threshold for the remaining words. From the steps 208, 210, 212, 214, and 216 processing continues at a step 218 where the rejection threshold is transmitted to the voice recognition module 12. Processing then returns to the main program via the exit point 220. Of course, the program can be altered such that any combination of the standard, below standard, and above-standard rejection thresholds can be used for any of the words processed through the voice recognition module 12.

Figure 9:
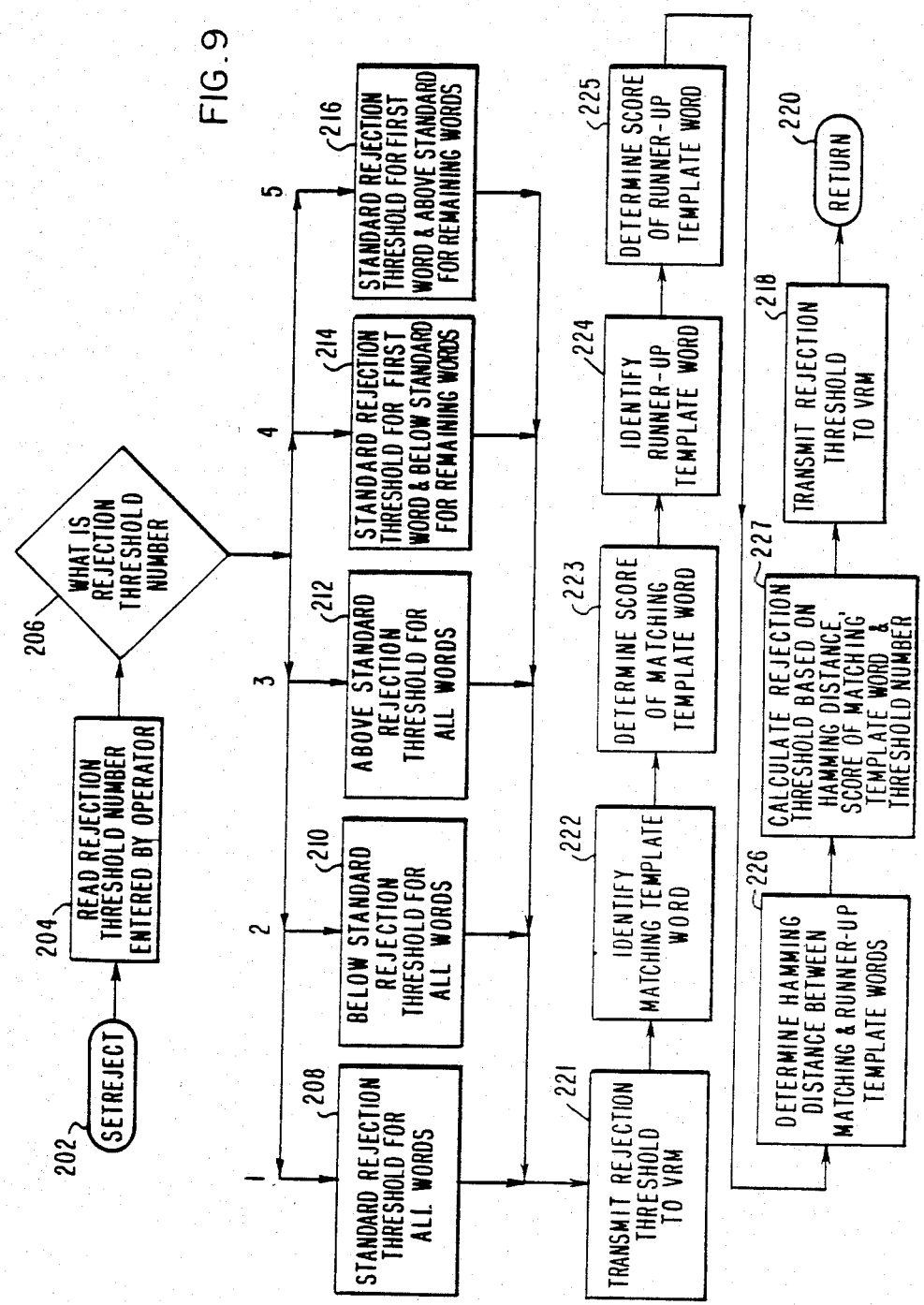

FIG. 9 illustrates a second embodiment for the SETREJECT function. The processing steps of FIG. 9 are identical in function to the processing steps bearing identical reference characters in FIG. 8. After the operator has entered the rejection threshold number and processing through the steps 208, 210, 212, 214, or 216 has been completed, processing continues at a step 221 where the rejection threshold is transmitted to the voice recognition module 12. At a step 222, the voice recognition module 12 identifies the template word having the most binary bits in agreement with the user's spoken word, i.e., the matching template word. At a step 223, the number of binary bits in agreement (the score) of the matching template word is determined. At a step 224, the voice recognition module 12 identifies a runner-up template word, i.e., that template word having the second largest number of binary bits in agreement with the binary bits of the user's spoken word. The score of the runner-up template word is determined at a step 225. At a step 226, the program determines the Hamming distance, or difference, between the score of the matching template word and the score of the runner-up template word. At a step 227 the program calculates a rejection threshold based on the Hamming distance between the matching and runner-up template words, the score of the matching template word, and the rejection threshold number entered by the operator. At the step 218, the rejection threshold is transmitted to the voice recognition module 12 for use in comparing the next spoken word of the user with the template words. Processing then returns to the main program via the exit point 220.

Figure 10:
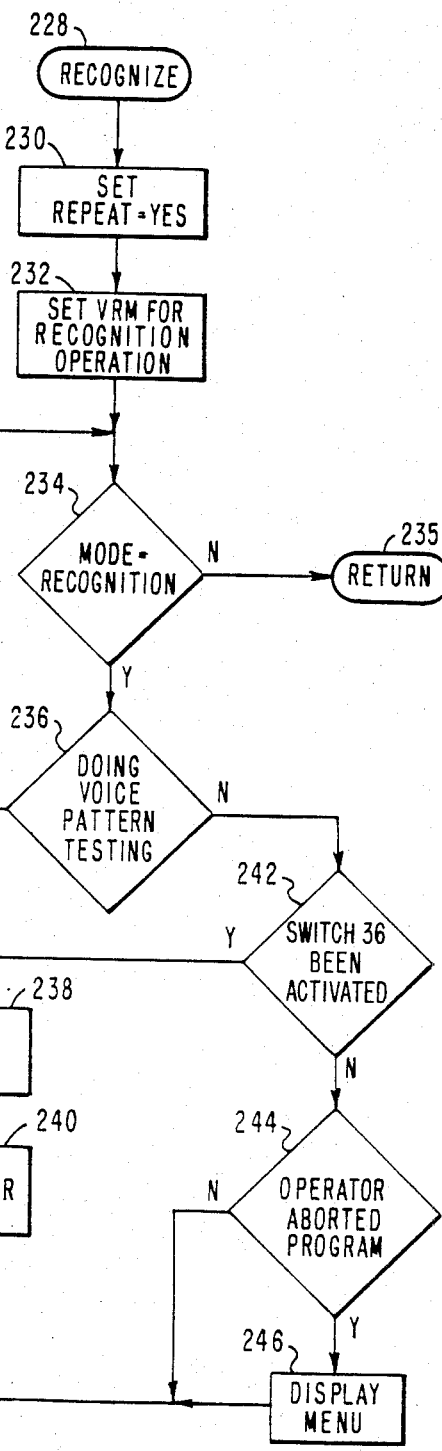

The RECOGNIZE function of FIG. 10 is of course the primary function for the voice-controlled elevator security system 8. The RECOGNIZE function operates whenever the voice-controlled elevator security system 8 is operative, either awaiting a spoken word from a user or interacting with a user. The RECOGNIZE function is also called by the TEST function which will be discussed hereinafter. The RECOGNIZE function is entered at an entry point 228 and at a step 230 the REPEAT variable is set equal to YES. At a step 232 the voice recognition module 12 is ready for the recognition operation. Processing continues to a decision step 234 where a determination is made whether the voice-controlled elevator security system 8 is operating in a recognition mode (i.e. the secure or train and test mode). If the result of the decision step 234 is negative, processing returns to the main program via an exit point 235. If the result from the decision step 234 is affirmative, processing moves to a decision step 236. In the decision step 236, a decision is made regarding whether the voice-controlled elevator security system 8 is doing voice pattern testing as described in detail in the TEST function flow chart of FIG. 13. If the voice-controlled elevator security system is not doing voice pattern testing, processing moves to a decision step 242. The decision step 242 determines whether a user has requested activation of the voice-controlled elevator security system 8 by activating the switch 36. If the decision step 242 renders an affirmative decision, processing continues to a step 238 where the GETWORDS function (see FIG. 11) is called. The GETWORDS function performs the actual comparison process. Following the step 238 processing continues to a step 240 where a CHECKTAMPER function (see FIG. 12) is called. The CHECKTAMPER function determines whether the user has exceeded a predetermined number of attempts at matching the spoken word with a template work. Following the step 240 processing moves to an entry point immediately preceding the decision step 234.

Returning to the decision step 242, if the switch 36 has not been activated processing moves to a decision step 244 which determines whether the operator has aborted the program. If the operator has not done so, processing moves to the entry point immediately preceding the decision step 234. If the operator has aborted the program, processing moves to a step 246 wherein the function menu is displayed on the data entry and display terminal 20.

Returning to the decision step 236, if the voice-controlled elevator security system is in the process of doing voice pattern testing, processing immediately moves to the step 238 where the GETWORDS function is called after which the CHECKTAMPER function is called at the step 240.

Figure 11:
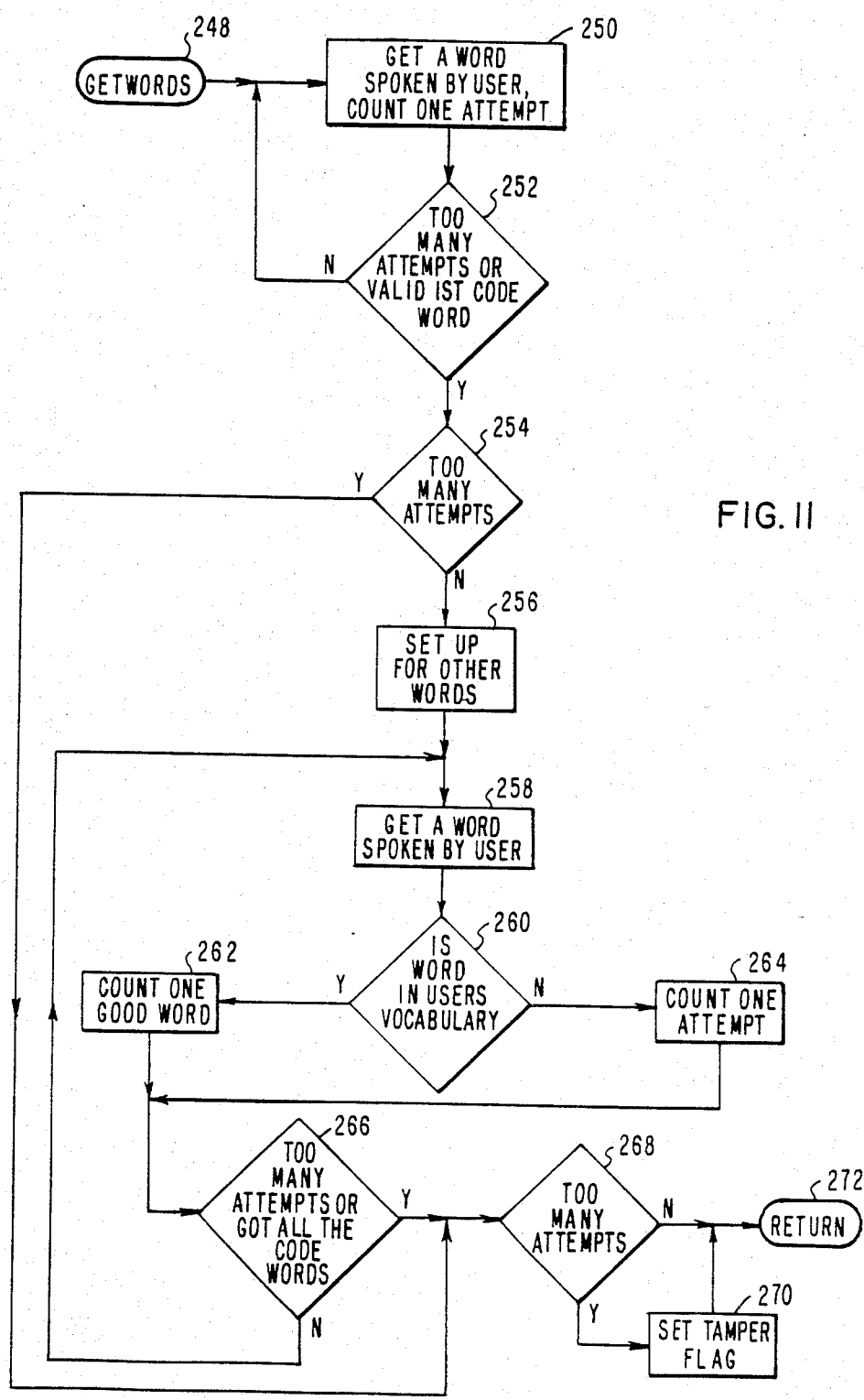

The GETWORDS function, illustrated in FIG. 11, is called by the RECOGNIZE function and is entered at an entry point 248. Processing continues to a step 250 where the program gets a word spoken by the user and counts one attempt. Processing then moves to a decision step 252 where the program determines whether there have been an excessive number of attempts at matching a spoken word with a template word or if the first spoken word was matched with a template word. If the result of the decision step 252 is negative, processing returns to an entry point immediately preceding the step 250. If the result of the decision step 252 is affirmative, processing continues to a decision step 254 which determines whether there have been an excessive number of attempts at matching the spoken word with a template word or whether the first word was valid. If there have been an excessive number of attempts, the program continues at a decision point 268 which asks whether there have been an excessive number of attempts. If the answer at the decision step 268 is affirmative, the tamper flag is set at a step 270 and processing returns to the main program via an exit point 272. If the decision step 268 produces a negative response, processing returns immediately to the main program via the exit point 272.

Returning to the decision step 254, if there have not been an excessive number of attempts, processing moves to a step 256 wherein the user is either prompted to recite the next word in the sequence or prompted to repeat the previously spoken word. At step 258 the voice recognition module 12 gets a word spoken by the user and at a decision step 260 determines whether any of the template words match the spoken word. To make this comparison the voice recognition module 12 utilizes the rejection threshold as determined by the SETREJECT function. If the answer fron the decision step 260 is affirmative, the program counts one good word at a step 262 and moves to a decision step 266. In the decision step 266, a determination is made regarding whether there have been an excessive number of matching attempts or whether all of the words have been recited by the user. If the answer at the decision step 266 is affirmative, processing moves to the decision step 268 which inquires whether there have been an excessive number of attempts as previously discussed. If the answer at the decision step 266 is negative, processing returns to an entry point immediately preceding the step 258 to get an additional word spoken by the user for comparison with the template words.

Returning to the decision step 260, if the spoken word does not match any of the template words, the response at the decision step 260 is negative and processing moves to a step 264 wherein the program will count one attempt. Following the step 264, the program determines, at the decision step 266, whether there have been an excessive number of attempts or whether the user has recited all the code words, as previously discussed.

The evaluation required at the decision step 260 is performed by the voice recognition module 12 under control of the microprocessor 14. In one embodiment of the present invention the voice recognition module 12 is the voice recognition module (VRM) available from Interstate Electronics Corporation of Anaheim, Calif.

The Interstate VRM has a storage capacity of only one-hundred template words. If it is assumed there are only twenty authorized users, this would allow five distinct template words per authorized user. To facilitate the data transfer for each user, in this embodiment each user's template words are placed in five consecutive memory locations in the Interstate VRM. The first template word could be the user's last name, and the remaining four words chosen at will.

Furthermore, the program operates such that each authorized user's first template word provides access to only the remaining four memory locations associated with that authorized user. This eliminates the possibility of the spoken word being matched with a template word of another user.

Various recognition criteria, in conjunction with the rejection threshold, can be used for the present invention. Broadly, these can be characterized as sequential and cumulative.

The sequential criteria requires a definite law defining the order in which the spoken words must be pronounced to be accepted. The law may be as simple as the sequence $n$, $n+1$, $n+2$, $n+3$, or any predetermined combination of these values. These combinations can be programmed and changed at will. The cumulative criteria requires that all the code words must be recognized, irrespective of order. Some security is sacrificed in this lattercase.

System capabilities are limited by the size of the Interstate VRM memory. These capabilities can, however, be effectively increased with proper use of the voice file 16. For example, the first template word, e.g., the user's last name, could call a retrieval of 100 template words from the voice file 16 into the voice recognition module 12. These template words could be then used for the recognition process with the last word of the sequence calling retrieval of the next 100 words. A concatenation of these calls can provide a large effective memory for the voice recognition module 12.

Figure 12:
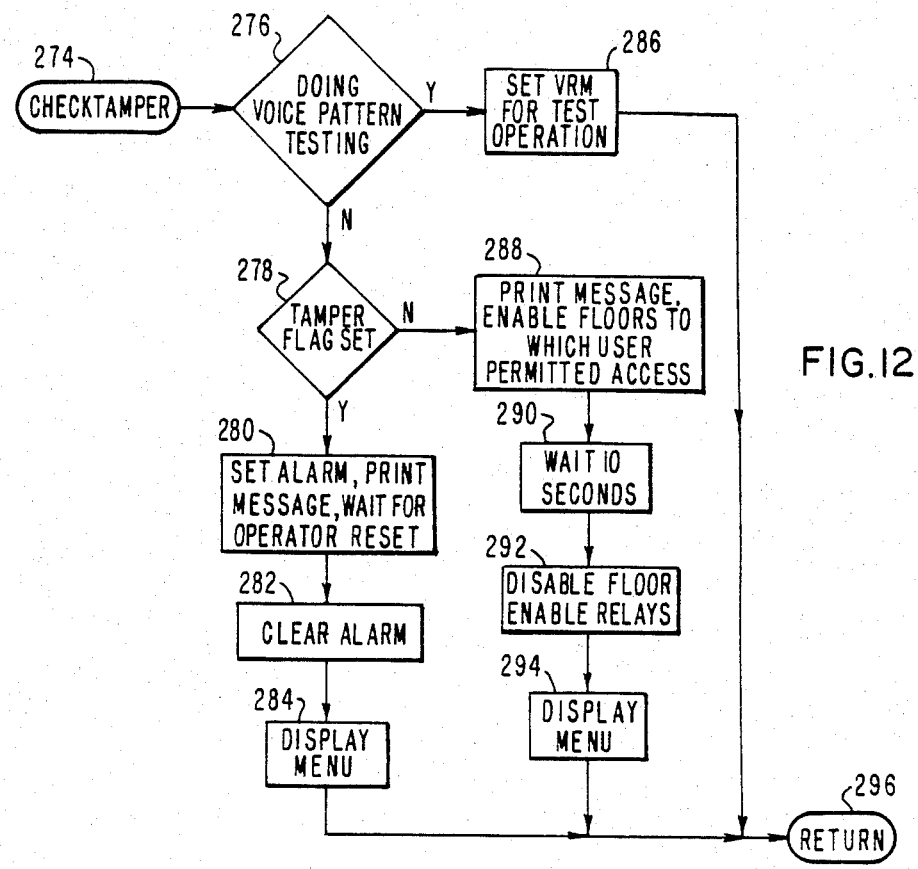

Following execution of the GETWORDS function, processing in the RECOGNIZE function calls the CHECKTAMPER function illustrated in FIG. 12. The CHECKTAMPER function is entered at an entry point 274 and processing continues to a decision step 276. The decision step 276 asks whether the voice-controlled elevator security system 8 is performing voice pattern testing. If the response is affirmative processing moves to a step 286 wherein the voice recognition module 12 is prepared for the test operation. Following the step 286, processing returns to the main program via the exit point 296.

If the response at the decision step 276 is negative, processing moves to a decision step 278 wherein a check is made to determine if the tamper flag has been set. If it has not been set, indicating that the user has been recognized as an authorized user, processing moves to a step 288 wherein a message is printed on the data entry and display terminal 20 and the floor relays, for the floors to which the authorized user is permitted access, are enabled by the microprocessor 14. Processing then waits 10 seconds at a step 290 and disables the floor relays at a step 292. At a step 294, the function menu is displayed on the data entry and display terminal 20, and processing returns to the main program via the exit point 296. If the tamper flag has been set, the response from the decision step 278 is affirmative and processing moves to a step 280. In the step 280 an alarm is set, an alarm message is printed, and the program waits for a reset to be entered by the operator. When the reset is entered the alarm is cleared at a step 282 and the menu is displayed at a step 284. Processing then returns to the main program via the exit point 296.

Figure 13:
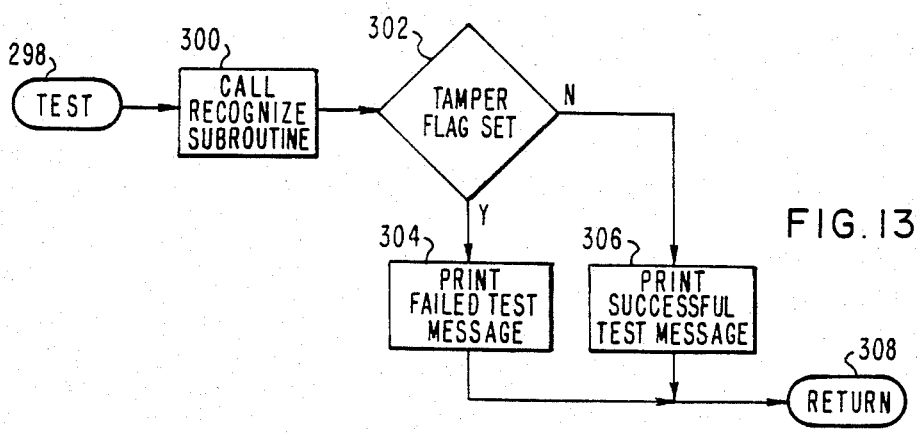

The TEST function, illustrated in FIG. 13, allows a user to verify that his spoken word sequence can be recognized by the voice-controlled elevator security system 8. The TEST function is entered at an entry point 298 followed by a step 300 wherein the RECOGNIZE function is called. Processing continues to a decision step 302 which determines whether the tamper flag was set during the GETWORDS function. If the tamper flag was not set, a successful test message is printed at a step 306 and processing returns to the main program via an exit point 308. If the tamper flag was set, processing continues at a step 304 where a failed test message is printed. From the step 304, processing continues at the main program via an exit point 308.

Figure 14:
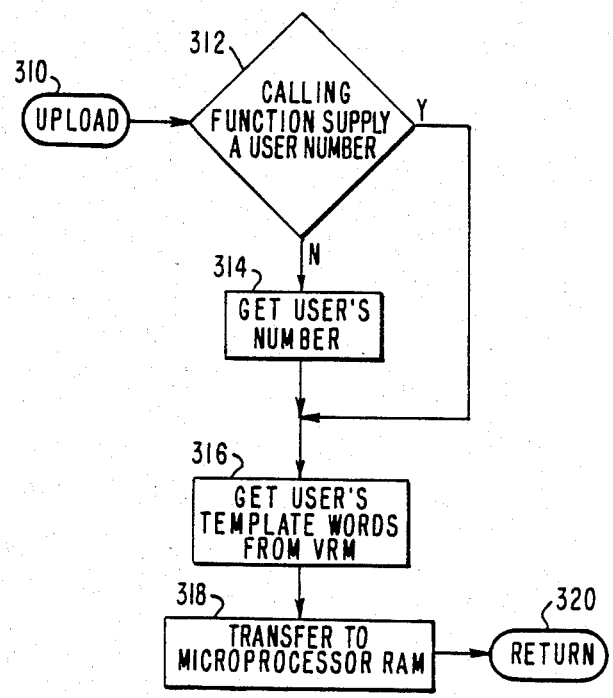

The UPLOAD function is illustrated in FIG. 14; the UPLOAD function transfers the template words from the voice recognition module 12 to the random access memory in the microprocessor 14. The UPLOAD function is entered at an entry point 310 and processing continues to a decision step 312. The decision step 312 inquires whether the subroutine calling the UPLOAD function supplied a user number. If a user number was not supplied, processing moves to step 314 which gets the user's number and step 314 proceeds to a step 316, wherein the users vocabulary is taken from the voice recognition module 12. In a succeeding step 318, the users vocabulary is transferred to the random access memory in the microprocessor 14. Processing then returns to the main program via the exit point 320. If the calling function supplies a user number, the response from the decision step 312 is affirmative and processing moves immediately to the step 316 wherein the user's template words are transferred from the voice recognition module 12. Processing then continues with the steps 318 and 320 as previously discussed.

Figure 15:
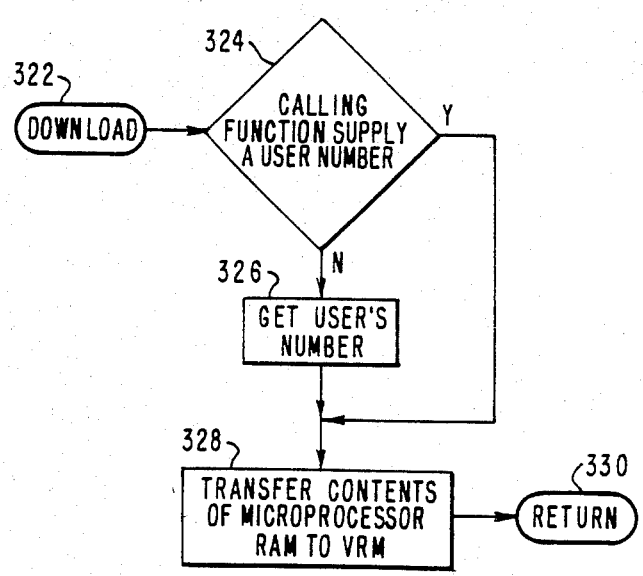

The DOWNLOAD function, illustrated in FIG. 15, transfers the contents of the random access memory in the microprocessor 14 to the voice recognition module 12 for later use in comparing with words spoken by a user. The DOWNLOAD function is entered at an entry point 322; processing moves to a decision step 324 which inquires whether the calling function supplied a user number. If the answer in the decision step 324 is negative, the user number is secured from the operator at a step 326. Processing then moves to a step 328 where the contents of the random access memory of the microprocessor 14 are transferred to the voice recognition module 12. Processing continues at the main program via an exit point 330. If the calling function supplied a user number, the step 326 is bypassed and processing moves immediately to the step 328 and then to the step 330.

The TTOVF function for transferring template words from the voice recognition module 12 to the voice file 16 is illustrated in FIG. 16. Processing for the TTOVF function begins at an entry point 332 and continues to a step 334 wherein the operator is asked to enter the user number of the user for whom the template words is to be transferred. Entry of zero by the operator indicates that the template words of all users are to be transferred. At step 336 the entered user number is evaluated to determine whether it is a zero. If it is not zero, processing continues to a step 340 wherein a transfer count is set for one user. If the number entered is zero, processing moves to a step 338 wherein the transfer count is set for all users. Following the step 338 or the step 340, processing moves to a step 342 where the UPLOAD function is called. In a step 344 a user's template words are transferred from the voice recognition module 12 to the random access memory of the microprocessor 14. Processing continues to a step 346 where the template file is transferred from the microprocessor 14 to the voice file 16. At a step 348 one transfer is counted. At a decision step 350, a determination is made as to whether all of the transfers have been completed. If the response is negative, processing moves to an entry point immediately preceding the step 342 for transfer of additional template words of other users. If all transfers are complete, the response from the decision step 350 is affirmative and a completion message is printed at a step 352. The step 352 also appends the users' accessible floor data to the user's template words as the transfer occurs. Processing returns to the main program via the exit point 354.

The RFRVF function illustrated in FIG. 17 retrieves template words from the voice file 16 and transfers them to the voice recognition module 12. The RFRVF function is entered at an entry point 356 and processing continues to step 358 where the operator enters a user number via the data entry and display terminal 20. If the operator enters a zero, all template words for all users are transferred. At a step 360 the user number is evaluated and if it is zero, processing continues to a step 362 where the transfer count is set for all users. If the user number is not zero, processing moves to a step 364 where the transfer count is set to transfer the template words of one user. Following the step 362 or the step 364, processing moves to a step 366 wherein the template file is obtained from the voice file 16 and stored in the random access memory of the microprocessor 14. At a step 368, the DOWNLOAD function is called for transferring the template words from the microprocessor 14 to the voice recognition module 12. A decision step 370 is encountered next wherein inquiry is made as to whether all of the transfers have been completed. If all transfers have not been completed, processing returns to an entry point immediately preceding the step 366. If all transfers have been completed, processing moves to a step 372 where a completion message is printed. Processing continues at the main program via an exit point 374.

The FLORMA function illustrated in FIG. 18, allows the operator to enter the floor numbers to which each user is permitted access. The FLORMA function is entered at an entry point 376 and processing continues to a step 378 wherein the operator enters the users number. At a step 380 the operator then enters the total number of floors to which the user is to be permitted access. At a step 382 the FLORMA function prompts the operator to enter each floor number. The operator makes that entry at a step 384 and at a step 386 a bit mask of the user's template words is modified to include the floor numbers. At a decision step 388, a determination is made regarding whether all the floors to be accessed have been entered. If all floors have not been entered, processing returns to an entry point immediately preceding the step 382. If all the accessible floors have been entered, processing continues at step 390 wherein a completion message is printed. Processing then returns to the main program via an exit point 392.

Figure 19:
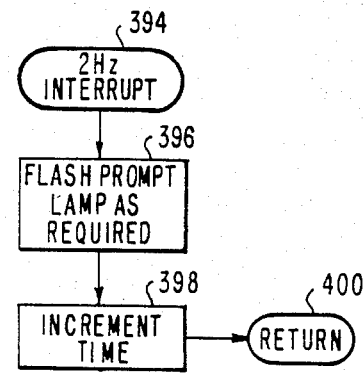

During the running of the main program depicted by the preceding flow charts processing is interrupted at 2 Hz intervals as illustrated by the flow chart of FIG. 19. The flow chart of FIG. 19 is entered at an entry point 394 and the PROMPT lamp 58 is flashed as required as indicated at step 396. At step 398 a real-time clock is incremented. The clock is used to control flashing of the PROMPT lamp 58 and is also used in other functions where it is required that processing be halted until a specified number of seconds has elapsed. Return to the main program is via an exit point 400.

The discussion of the software flow charts illustrated in FIGS. 5 through 19 is intended for purposes of illustration and not limitation. It is anticipated that alternative embodiments of the present invention may be conceived wherein the location of the instructions for performing the various functions is different from that shown in the discussed flow charts. These alternative embodiments are believed to fall within the spirit and scope of the present invention as claimed hereinafter.

Figure 20:
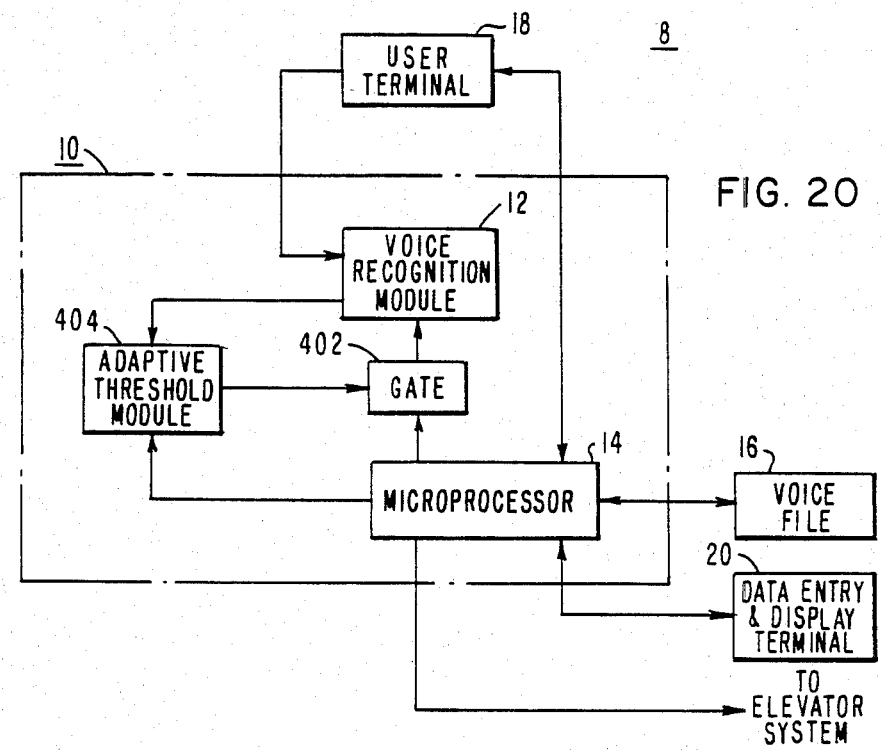
FIG. 20 is a block diagram of a first alternative embodiment of the elevator security system of FIG. 1.

Turning now to FIG. 20, there is shown an alternative embodiment of the voice-controlled elevator security system 8. The components of FIG. 20 are identical in structure and function to the components bearing identical reference characters in FIG. 1. A gate 402 is responsive to the microprocessor 14 and the voice recognition module 12 is responsive to the gate 402. The gate 402 is responsive to an adaptive threshold module 404. The adaptive threshold module 404 is responsive the voice recognition module 12 and the microprocessor 14.

The adaptive threshold module 404 is intended to be a hardware implementation for establishing the rejection threshold to be used in lieu of the step 227 shown in FIG. 9. The adaptive threshold module 404 receives the Hamming distance and the score of the matching template word, as defined in the discussion of FIG. 9, from the voice recognition module 12. From the microprocessor 14, the adaptive threshold module 404 receives the rejection threshold as entered by the operator at the data entry terminal 20. The adaptive threshold module 404 calculates the rejection threshold based on the three signals input thereto and transfers the rejection threshold to the gate 402. The gate 402 receives timing signals from the microprocessor 14 and at the appropriate instant inputs the threshold rejection to the voice recognition module 12 for use in subsequent comparisons therein.

Figure 21:
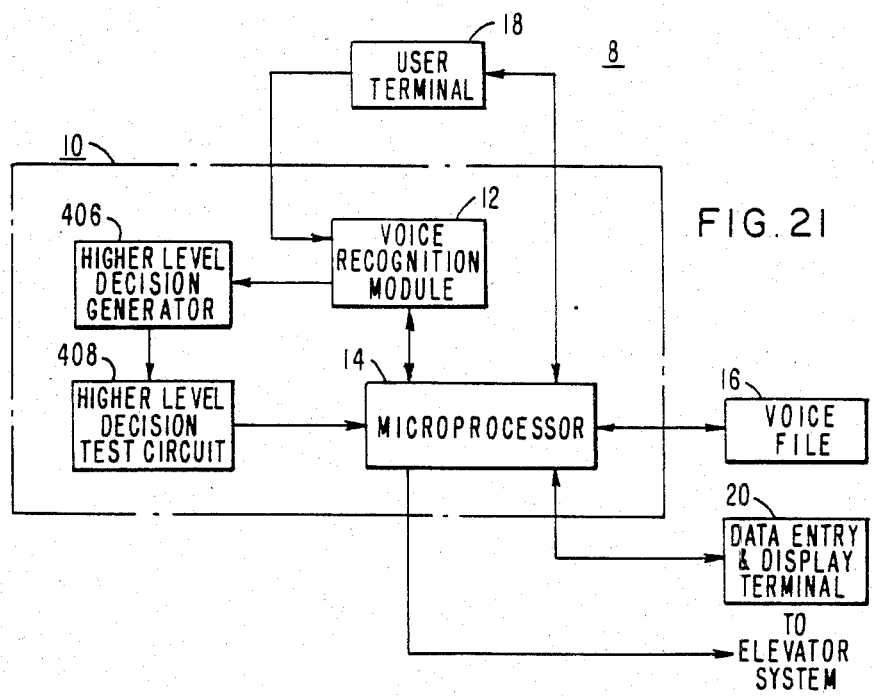
FIG. 21 is a block diagram of a second alternative embodiment of the elevator security system of FIG. 1.

Turning to FIG. 21, the components therein are identical in structure and function to the components bearing identical reference characters in FIG. 20. FIG. 21 illustrates a more elaborate recognition scheme for the voice-controlled elevator security system 8. After the voice recognition module 12 selects a preliminary matching template word using the rejection threshold entered by the operator at the data entry and display terminal 20, the voice rejection module 12 calculates the Hamming distance and winner's score (as previously defined). The Hamming distance and winner score are input to a higher level decision generator 406. The Hamming distance and the winner's score are combined in the higher level decision generator 406 and the resulting signal input to a higher level decision test circuit 408. Only when the preliminary matching template word, as chosen by the voice recognition module 12, passes the criteria established in the higher level decision test circuit, is it regarded as the matching template word. The microprocessor 14 receives a signal from the higher level decision test 408 indicative of the matching template word.

What is claimed is:

1. A voice-controlled elevator security system, including at least one elevator car mounted in a building having a plurality of floors, including a lobby floor, wherein authorized users are each pre-enabled to gain access to a predetermined floor, or floors, of the building from the lobby floor and each authorized user has provided template utterances, said voice-controlled elevator security system comprising:

first memory means for storing template utterances of authorized users, with said template utterances being represented by a plurality of binary bits;

second memory means for storing preselected landings to which each authorized user is permitted access;

digitizing means for digitizing a prospective user's spoken utterance, with the user's digitized spoken utterance being represented by a plurality of binary bits;

recognition means for comparing the prospective user's digitized spoken utterance with at least certain of the template utterances, and for selecting a template utterance having the largest number of binary bits in agreement with the binary bits of the digitized spoken utterance;

threshold means for establishing a threshold limit;

comparator means for comparing the number of binary bits in agreement with said threshold limit and for producing an enable signal when the number of binary bits in agreement exceeds said threshold limit;

said enable signal indicating that the prospective user is the authorized user associated with the selected template;

and call selecting means responsive to said enable signal for enabling a recognized authorized user to gain access to an elevator car at the lobby floor;

said call selecting means further being responsive to said enable signal for enabling the recognized authorized user to direct the accessed elevator car only to an associated pre-enabled floor;

said call selecting means including landing selecting means in the at least one elevator car and up-call selecting means at the lobby floor, wherein activation of the voice controlled elevator security system disables the landing selecting means in the at least one elevator car, except the landing selecting means for the lobby floor, and disables the up-call selecting means on the lobby floor, and wherein identification of the user as an authorized user automatically activates the up-call selecting means on the lobby floor and enables the landing selecting means in the at least one elevator car for those floors to which the authorized user has been pre-enabled to gain access.

2. The voice-controlled elevator security system of claim 1 wherein the means for digitizing the prospective user's spoken utterance includes terminal means having a switch, activation of which enables the prospective user to interact with the voice-controlled elevator security system.

3. The voice-controlled elevator security system of claim 2 wherein the terminal means includes display means responsive to the enable signal for indicating that the prospective user is an authorized user.

4. The voice-controlled elevator security system of claim 2 wherein the terminal means includes display means for advising the prospective user when to recite the spoken utterance, said display means being responsive to the comparator means.

5. The voice-controlled elevator security system of claim 4 wherein the comparator means produces a repeat signal when the largest number of binary bits in agreement for a digitized spoken utterance is less than the threshold limit.

6. The voice-controlled elevator security system of claim 5 wherein the display means, in response to the repeat signal, advises the prospective user to repeat the spoken utterance.

7. The voice-controlled elevator security system of claim 1 wherein:
 (a) the template utterance for each authorized user includes a plurality of template words maintained in a group,
 (b) the recognition means compares the prospective user's initial digitized spoken utterance with only a predetermined one of the template words of each group, to identify the group in which this predetermined template word has the largest number of binary bits in agreement with the binary bits of the initial spoken utterance,
 (c) the digitizing means digitizes subsequent spoken utterances by the prospective user, and
 (d) the recognition means compares each subsequent spoken utterance only with template words from the identified group.

8. The voice-controlled elevator security system of claim 7 wherein the recognition means compares each digitized spoken utterance succeeding the first digitized spoken utterance with only a predetermined one of the template words of the identified group, with the predetermined template word having the same relative position in the group of template words as the digitized spoken word has in a group of spoken utterances.

9. The voice-controlled elevator security system of claim 7 wherein:
 (a) the comparator means is responsive to each comparison of the recognition means,
 (b) the threshold means establishes a threshold limit for each digitized spoken utterance,
 (c) the threshold limit for each utterance following the initial utterance of a prospective user is functionally related to the number of binary bits in agreement for a preceding digitized spoken word of the same user, and
 (d) the comparator means only provides an enable signal when all comparisons made relative to a prospective user exceed the associated threshold limit.

10. The voice-controlled elevator security system of claim 9 wherein:
 (a) the recognition means also selects a runner-up template word having a second largest number of binary bits in agreement with the binary bits of the digitized spoken utterance, and
 (b) the threshold limit established by the threshold means, for each utterance of a prospective user following the initial utterance, is also functionally related to the number of binary bits in agreement in the runner-up template word.

11. The voice-controlled elevator security system of claim 10 wherein the threshold limit for a digitized spoken utterance is functionally related to the difference between the largest number of binary bits in agreement and the second largest number of binary bits in agreement, for a preceding digitized spoken utterance of the same prospective user.

12. The voice-controlled elevator security system of claim 10 wherein the threshold means includes manual means for manually establishing a threshold limit, and wherein the threshold limit for a digitized spoken utterance is functionally related to the difference between the largest number of binary bits in agreement and the second largest number of binary bits in agreement for a preceding digitized spoken utterance of the same prospective user, to the largest number of binary bits in agreement for said preceding digitized spoken utterance of the same prospective user, and to said manual means.

13. The voice-controlled elevator security system of claim 1 wherein the spoken utterance of an authorized user includes a plurality of spoken words, the template utterance includes a like plurality of associated template words, and including an update operational mode wherein the authorized user can update selected ones of the template words.

14. The voice-controlled elevator security system of claim 1 including a tamper alarm activated when a prospective user fails to qualify as an authorized user.

15. The voice-controlled elevator security system of claim 1 including a train operational mode wherein the authorized user recites an utterance,
 the recognition means extracts from the utterance spoken by the authorized user the significant characteristic features thereof and stores the significant characteristic features in the first memory means,
 and including a test operational mode wherein each one of the authorized user's digitized spoken utterances is compared with a template utterance for determining whether the enable signal is produced.

16. The voice-controlled elevator security system of claim 7 wherein:
 (a) the comparator means is responsive to each comparison of the recognition means, and
 (b) the threshold means establishes a threshold limit for each digitized spoken utterance as a function of the numerical position of the associated template word in the selected group.

17. The voice-controlled elevator security system of claim 7 wherein:
 (a) the comparator means is responsive to each comparison of the recognition means, and
 (b) the threshold means establishes a standard threshold limit which is applied to each digitized spoken utterance.

18. The voice-controlled elevator security system of claim 7 wherein:
 (a) the comparator means is responsive to each comparison of the recognition means, and
 (b) the threshold means establishes a standard threshold limit, and an auxiliary threshold limit which is below the standard threshold limit, with the auxiliary limit being applied to each digitized spoken utterance.

19. The voice-controlled elevator security system of claim 7 wherein:
 (a) the comparator means is responsive to each comparison of the recognition means, and (b) the threshold means establishes a standard threshold limit, and an auxiliary threshold limit which is above the standard threshold limit, with auxiliary limit being applied to each digitized spoken utterance.

20. The voice-controlled elevator security system of claim 7 wherein:
(a) the comparator means is responsive to each comparison of the recognition means, and
(b) the threshold means establishes a standard threshold limit, and an auxiliary threshold limit which is below the standard threshold limit, with said standard and auxiliary limits being applied to selected digitized spoken utterances as a function of the numerical position of the associated template word in the selected group.

21. The voice-controlled elevator security system of claim 7 wherein:
(a) the comparator means is responsive to each comparison of the recognition means, and
(b) the threshold means establishes a standard threshold limit, and an auxiliary threshold limit which is above the standard threshold limit, with said standard and auxiliary limits being applied to selected digitized spoken utterances as a function of the numerical position of the associated template word in the selected group.

* * * * *